United States Patent
Bookbinder et al.

(10) Patent No.: US 10,065,884 B2
(45) Date of Patent: Sep. 4, 2018

(54) METHODS FOR PRODUCING STRENGTHENED AND DURABLE GLASS CONTAINERS

(71) Applicant: Corning Incorporated, Corning, NY (US)

(72) Inventors: Dana Craig Bookbinder, Corning, NY (US); Richard Michael Fiacco, Corning, NY (US); Timothy Michael Gross, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/949,320

(22) Filed: Nov. 23, 2015

(65) Prior Publication Data

US 2016/0145150 A1    May 26, 2016

Related U.S. Application Data

(60) Provisional application No. 62/084,877, filed on Nov. 26, 2014.

(51) Int. Cl.
  *C03C 17/23* (2006.01)
  *C03B 23/11* (2006.01)
  (Continued)

(52) U.S. Cl.
  CPC ............. *C03C 15/02* (2013.01); *A61J 1/1468* (2015.05); *C03B 23/11* (2013.01); *C03C 4/20* (2013.01);
  (Continued)

(58) Field of Classification Search
  CPC ... C03C 21/002; C03C 15/00; C03C 2217/78; C03C 4/20; C03C 17/00; C03C 23/00; C03C 17/003–17/005
  See application file for complete search history.

(56) References Cited

U.S. PATENT DOCUMENTS

| 2,106,744 A | 2/1938 | Hood et al. |
| 2,323,643 A | 7/1943 | Barton |
| (Continued) | | |

FOREIGN PATENT DOCUMENTS

| CA | 1333785 C | 1/1995 |
| CA | 101585666 A | 11/2009 |
| (Continued) | | |

OTHER PUBLICATIONS

Pappalardo, L. T., "DSC Evaluation of Epoxy and Polyimide-Impregnated Laminates (Prepregs)"; Journal of Applied Polymer Science, vol. 21, 809-820, John Wiley & Sons, Inc. (1977).

(Continued)

*Primary Examiner* — Jodi Cohen Franklin
(74) *Attorney, Agent, or Firm* — Dinsmore & Shohl LLP

(57) ABSTRACT

A method of forming a glass container including forming a glass container having a sidewall at least partially enclosing an interior volume, at least a portion of an interior surface of the sidewall having an interior surface layer; and contacting the glass container with a substantially fluoride-free aqueous treating medium to remove a thin layer of the interior surface layer having a thickness of from about 100 nm to about 1.0 μm from the interior surface of the sidewall. The interior surface is resistant to delamination. Before contacting the glass container with the substantially fluoride-free aqueous treating medium, the exterior surface of the sidewall comprises strength-limiting surface flaws having a first shape, and after the contacting the exterior surface of the sidewall with the substantially fluoride-free aqueous treating medium, the strength-limiting surface flaws have a second shape.

18 Claims, 2 Drawing Sheets

(51) Int. Cl.

| | |
|---|---|
| C03C 15/02 | (2006.01) |
| C03C 4/20 | (2006.01) |
| C03C 17/00 | (2006.01) |
| C03C 15/00 | (2006.01) |
| C03C 17/30 | (2006.01) |
| C03C 17/32 | (2006.01) |
| C03C 21/00 | (2006.01) |
| C03C 23/00 | (2006.01) |
| A61J 1/14 | (2006.01) |
| A61J 1/05 | (2006.01) |

(52) U.S. Cl.
CPC ............ *C03C 15/00* (2013.01); *C03C 17/005* (2013.01); *C03C 17/30* (2013.01); *C03C 17/32* (2013.01); *C03C 21/002* (2013.01); *C03C 23/00* (2013.01); *C03C 23/0075* (2013.01); *A61J 1/05* (2013.01); *C03C 2217/70* (2013.01)

(56) References Cited

U.S. PATENT DOCUMENTS

| | | | |
|---|---|---|---|
| 2,691,548 A | 10/1954 | Feucht et al. | |
| 2,753,304 A | 7/1956 | Orozco | |
| 2,947,615 A | 8/1960 | Greene et al. | |
| 3,023,139 A | 2/1962 | Tetterode | |
| 3,323,889 A | 6/1967 | Carl et al. | |
| 3,395,069 A | 7/1968 | Plueddemann | |
| 3,441,432 A | 4/1969 | Levene | |
| 3,445,267 A | 5/1969 | Layne | |
| 3,577,256 A | 5/1971 | Benford, Jr. et al. | |
| 3,607,186 A | 9/1971 | Bognar | |
| 3,674,690 A | 7/1972 | Clow et al. | |
| 3,772,061 A | 11/1973 | McCoy et al. | |
| 3,772,135 A | 11/1973 | Hara et al. | |
| 3,779,732 A | 12/1973 | Spanoudis | |
| 3,801,361 A | 4/1974 | Kitaj | |
| 3,811,921 A | 5/1974 | Crawford et al. | |
| 3,819,346 A | 6/1974 | Southwick et al. | |
| 3,844,754 A | 10/1974 | Grubb et al. | |
| 3,876,410 A | 4/1975 | Scholes | |
| 3,878,960 A | 4/1975 | Jonsson et al. | |
| 3,900,329 A | 8/1975 | Grubb et al. | |
| 3,926,604 A | 12/1975 | Smay et al. | |
| 3,958,073 A | 5/1976 | Trevisan et al. | |
| 3,967,995 A | 7/1976 | Fabianic | |
| 3,975,175 A * | 8/1976 | Foster ................. | C03C 8/24 216/97 |
| 3,989,864 A | 11/1976 | Hey et al. | |
| 4,021,218 A | 5/1977 | Watanabe | |
| 4,030,904 A | 6/1977 | Battye et al. | |
| 4,056,208 A | 11/1977 | Prejean | |
| 4,056,651 A | 11/1977 | Scola | |
| 4,065,317 A | 12/1977 | Baak et al. | |
| 4,065,589 A | 12/1977 | Lenard et al. | |
| 4,086,373 A | 4/1978 | Tobias et al. | |
| 4,093,759 A | 6/1978 | Otsuki et al. | |
| 4,130,677 A | 12/1978 | Huntsberger | |
| 4,161,556 A | 7/1979 | Lenard et al. | |
| 4,164,402 A * | 8/1979 | Watanabe ............... | C03C 15/00 65/30.14 |
| 4,214,886 A | 7/1980 | Shay et al. | |
| 4,215,165 A | 7/1980 | Gras et al. | |
| 4,238,041 A | 12/1980 | Jönsson et al. | |
| 4,264,658 A | 4/1981 | Tobias et al. | |
| 4,280,944 A | 7/1981 | Satio et al. | |
| 4,315,573 A | 2/1982 | Bradley et al. | |
| 4,386,164 A | 5/1983 | Moser | |
| 4,431,692 A | 2/1984 | Hofmann et al. | |
| 4,558,110 A | 12/1985 | Lee | |
| 4,595,548 A | 6/1986 | St. Clair et al. | |
| 4,603,061 A | 7/1986 | St. Clair et al. | |
| 4,620,985 A | 11/1986 | Goodburn et al. | |
| 4,636,411 A | 1/1987 | Dubois et al. | |
| 4,654,235 A | 3/1987 | Effenberger et al. | |
| 4,668,268 A | 5/1987 | Lindner et al. | |
| 4,680,373 A | 7/1987 | Gallagher et al. | |
| 4,689,085 A | 8/1987 | Plueddemann | |
| 4,696,994 A | 9/1987 | Nakajima et al. | |
| 4,748,228 A | 5/1988 | Shoji et al. | |
| 4,749,614 A | 6/1988 | Andrews et al. | |
| 4,767,414 A | 8/1988 | Williams et al. | |
| 4,778,727 A | 10/1988 | Tesoro et al. | |
| 4,842,889 A | 6/1989 | Hu et al. | |
| 4,860,906 A | 8/1989 | Pellegrini et al. | |
| 4,870,034 A | 9/1989 | Kiefer | |
| 4,880,895 A | 11/1989 | Higashi et al. | |
| 4,882,210 A | 11/1989 | Romberg et al. | |
| 4,902,106 A | 2/1990 | Dijon et al. | |
| 4,931,539 A | 6/1990 | Hayes | |
| 4,961,976 A | 10/1990 | Hashimoto et al. | |
| 4,961,996 A | 10/1990 | Carre et al. | |
| 4,983,255 A | 1/1991 | Gruenwald et al. | |
| 4,988,288 A | 1/1991 | Melgaard | |
| 5,002,359 A | 3/1991 | Sayegh | |
| 5,036,145 A | 7/1991 | Echterling et al. | |
| 5,037,701 A | 8/1991 | Carre et al. | |
| 5,049,421 A | 9/1991 | Kosh | |
| 5,112,658 A * | 5/1992 | Skutnik ................. | C03C 17/32 215/12.2 |
| 5,114,757 A | 5/1992 | Linde et al. | |
| 5,120,341 A | 6/1992 | Nozawa et al. | |
| 5,124,618 A | 6/1992 | Ohtaka et al. | |
| 5,230,429 A | 7/1993 | Etheredge, III | |
| 5,246,782 A | 9/1993 | Kennedy et al. | |
| 5,251,071 A | 10/1993 | Kusukawa et al. | |
| 5,252,703 A | 10/1993 | Nakajima et al. | |
| 5,258,487 A | 11/1993 | Okinoshima et al. | |
| 5,281,690 A | 1/1994 | Flaim et al. | |
| 5,286,527 A | 2/1994 | Blum et al. | |
| 5,306,537 A | 4/1994 | Gustafson et al. | |
| 5,310,862 A | 5/1994 | Nomura et al. | |
| 5,326,601 A | 7/1994 | Kawano et al. | |
| 5,336,925 A | 8/1994 | Moss et al. | |
| 5,337,537 A | 8/1994 | Soughan | |
| 5,403,700 A | 4/1995 | Heller et al. | |
| 5,476,692 A | 12/1995 | Ellis et al. | |
| 5,482,768 A | 1/1996 | Kawasato et al. | |
| 5,488,092 A | 1/1996 | Kausch et al. | |
| 5,498,758 A * | 3/1996 | Scholes ................. | C03C 17/005 427/255.19 |
| 5,504,830 A | 4/1996 | Ngo et al. | |
| 5,594,231 A | 1/1997 | Pellicori et al. | |
| 5,601,905 A | 2/1997 | Watanabe et al. | |
| 5,633,079 A | 5/1997 | Shoshi et al. | |
| 5,721,181 A | 2/1998 | Sehgal et al. | |
| 5,736,251 A | 4/1998 | Pinchuk | |
| 5,736,476 A | 4/1998 | Watzke et al. | |
| 5,756,144 A | 5/1998 | Wolff et al. | |
| 5,849,369 A | 12/1998 | Ogawa | |
| 5,851,200 A | 12/1998 | Higashikawa et al. | |
| 5,908,542 A | 6/1999 | Lee et al. | |
| 5,916,632 A | 6/1999 | Mishina et al. | |
| 5,938,919 A | 8/1999 | Najafabadi | |
| 5,979,714 A | 11/1999 | Bleile et al. | |
| 6,013,333 A | 1/2000 | Carson et al. | |
| 6,046,758 A | 4/2000 | Brown et al. | |
| 6,048,911 A | 4/2000 | Shustack et al. | |
| 6,084,034 A | 7/2000 | Miyama et al. | |
| 6,096,432 A | 8/2000 | Sakaguchi et al. | |
| 6,156,435 A | 12/2000 | Gleason et al. | |
| 6,200,658 B1 | 3/2001 | Walther et al. | |
| 6,214,429 B1 | 4/2001 | Zou et al. | |
| 6,232,428 B1 | 5/2001 | Deets et al. | |
| 6,277,950 B1 | 8/2001 | Yang et al. | |
| 6,346,315 B1 | 2/2002 | Sawatsky | |
| 6,358,519 B1 | 3/2002 | Waterman | |
| 6,444,783 B1 | 9/2002 | Dodd et al. | |
| 6,472,068 B1 | 10/2002 | Glass et al. | |
| 6,482,509 B2 | 11/2002 | Buch-Rasmussen et al. | |
| 6,537,626 B1 | 3/2003 | Spallek et al. | |
| 6,561,275 B2 | 5/2003 | Glass et al. | |
| 6,586,039 B2 | 7/2003 | Heinz et al. | |
| 6,599,594 B1 | 7/2003 | Walther et al. | |

(56) References Cited

U.S. PATENT DOCUMENTS

| | | |
|---|---|---|
| 6,627,377 B1 | 9/2003 | Itatani et al. |
| 6,737,105 B2 | 5/2004 | Richard |
| 6,797,396 B1 | 9/2004 | Liu et al. |
| 6,818,576 B2 | 11/2004 | Ikenishi et al. |
| 6,852,393 B2 | 2/2005 | Gandon |
| 6,866,158 B1 | 3/2005 | Sommer et al. |
| 6,921,788 B1 | 7/2005 | Izawa et al. |
| 6,939,819 B2 | 9/2005 | Usui et al. |
| 6,989,181 B2 | 1/2006 | Brandt |
| 7,087,307 B2 | 8/2006 | Nagashima et al. |
| 7,215,473 B2 | 5/2007 | Fleming |
| 7,236,296 B2 | 6/2007 | Liu et al. |
| 7,315,125 B2 | 1/2008 | Kass |
| 7,470,999 B2 | 12/2008 | Saito et al. |
| 7,569,653 B2 | 8/2009 | Landon |
| 7,619,042 B2 | 11/2009 | Poe et al. |
| 7,845,346 B2 | 12/2010 | Langford et al. |
| 7,871,554 B2 | 1/2011 | Oishi et al. |
| 7,985,188 B2 | 7/2011 | Felts et al. |
| 8,048,938 B2 | 11/2011 | Poe et al. |
| 8,053,492 B2 | 11/2011 | Poe et al. |
| 8,110,652 B2 | 2/2012 | Bito et al. |
| 8,234,883 B2 | 8/2012 | Krall, Jr. et al. |
| 8,273,801 B2 | 9/2012 | Baikerikar et al. |
| 8,277,945 B2 | 10/2012 | Anderson et al. |
| 8,302,428 B2 | 11/2012 | Borrelli et al. |
| 8,309,627 B2 | 11/2012 | Poe et al. |
| 8,324,304 B2 | 12/2012 | Burch et al. |
| 8,415,337 B1 | 4/2013 | Krishna |
| 8,518,545 B2 | 8/2013 | Akiba et al. |
| 8,522,575 B2 | 9/2013 | Wada |
| 8,820,119 B2 | 9/2014 | Kuwabara et al. |
| 9,010,150 B2 | 4/2015 | Kuwabara et al. |
| 9,034,442 B2 | 5/2015 | Chang et al. |
| 9,107,805 B2 | 8/2015 | Langsdorf et al. |
| 9,272,946 B2 | 3/2016 | Chang et al. |
| 9,346,707 B2 | 5/2016 | Danielson et al. |
| 9,428,302 B2 | 8/2016 | Fadeev et al. |
| 2002/0016438 A1 | 2/2002 | Sugo et al. |
| 2002/0037943 A1 | 3/2002 | Madsen |
| 2002/0081401 A1 | 6/2002 | Hessok et al. |
| 2002/0155216 A1 | 10/2002 | Reitz et al. |
| 2002/0182410 A1 | 12/2002 | Szum et al. |
| 2003/0072932 A1 | 4/2003 | Gandon |
| 2004/0096588 A1 | 5/2004 | Brandt |
| 2004/0105985 A1 | 6/2004 | Henze et al. |
| 2004/0199138 A1 | 10/2004 | McBay et al. |
| 2005/0048297 A1 | 3/2005 | Fukuda et al. |
| 2005/0061033 A1 | 3/2005 | Petrany et al. |
| 2005/0170722 A1 | 8/2005 | Keese |
| 2006/0099360 A1 | 5/2006 | Farha |
| 2006/0233675 A1 | 10/2006 | Stein |
| 2007/0010700 A1 | 1/2007 | Bensmann et al. |
| 2007/0060465 A1 | 3/2007 | Varshneya et al. |
| 2007/0065366 A1 | 3/2007 | Soliani Raschini et al. |
| 2007/0082135 A1 | 4/2007 | Lee |
| 2007/0116907 A1 | 5/2007 | Landon et al. |
| 2007/0157919 A1 | 7/2007 | Marandon |
| 2007/0178256 A1 | 8/2007 | Landon |
| 2007/0187280 A1 | 8/2007 | Haines et al. |
| 2007/0224427 A1 | 9/2007 | Kunita et al. |
| 2007/0225823 A1 | 9/2007 | Hawkins et al. |
| 2007/0293388 A1 | 12/2007 | Zuyev et al. |
| 2008/0069970 A1 | 3/2008 | Wu |
| 2008/0071228 A1 | 3/2008 | Wu et al. |
| 2008/0114096 A1 | 5/2008 | Qu et al. |
| 2008/0121621 A1* | 5/2008 | Stockum .......... C03C 15/00 216/97 |
| 2008/0199618 A1 | 8/2008 | Wen et al. |
| 2008/0214777 A1 | 9/2008 | Poe |
| 2008/0281260 A1 | 11/2008 | William et al. |
| 2008/0292496 A1 | 11/2008 | Madsen |
| 2008/0308444 A1 | 12/2008 | McClain et al. |
| 2009/0048537 A1 | 2/2009 | Lydon et al. |
| 2009/0092759 A1 | 4/2009 | Chen et al. |
| 2009/0126404 A1 | 5/2009 | Sakhrani et al. |
| 2009/0155490 A1 | 6/2009 | Bicker et al. |
| 2009/0155506 A1 | 6/2009 | Martin et al. |
| 2009/0155570 A1 | 6/2009 | Bonnet et al. |
| 2009/0162530 A1 | 6/2009 | Nesbitt |
| 2009/0162664 A1 | 6/2009 | Ou |
| 2009/0176108 A1 | 7/2009 | Toyama et al. |
| 2009/0197088 A1 | 8/2009 | Murata |
| 2009/0197390 A1 | 8/2009 | Rothwell et al. |
| 2009/0203929 A1 | 8/2009 | Hergenrother et al. |
| 2009/0208175 A1 | 8/2009 | Hongo et al. |
| 2009/0208657 A1 | 8/2009 | Siebenlist et al. |
| 2009/0215607 A1 | 8/2009 | Dejneka et al. |
| 2009/0220761 A1 | 9/2009 | Dejneka et al. |
| 2009/0239759 A1 | 9/2009 | Balch |
| 2009/0247699 A1 | 10/2009 | Buehler et al. |
| 2009/0269597 A1 | 10/2009 | Bito et al. |
| 2009/0275462 A1 | 11/2009 | Murata |
| 2009/0286058 A1 | 11/2009 | Shibata et al. |
| 2009/0297857 A1 | 12/2009 | Pascal et al. |
| 2009/0325776 A1 | 12/2009 | Murata |
| 2010/0009154 A1 | 1/2010 | Allan et al. |
| 2010/0044268 A1 | 2/2010 | Haines et al. |
| 2010/0047521 A1 | 2/2010 | Amin et al. |
| 2010/0056666 A1 | 3/2010 | Poe et al. |
| 2010/0062188 A1 | 3/2010 | Miyamoto et al. |
| 2010/0063244 A1 | 3/2010 | Poe et al. |
| 2010/0087307 A1 | 4/2010 | Murata et al. |
| 2010/0101628 A1 | 4/2010 | Poe et al. |
| 2010/0203270 A1 | 8/2010 | Langsdorf et al. |
| 2010/0246016 A1 | 9/2010 | Carlson et al. |
| 2010/0249309 A1 | 9/2010 | Lewin et al. |
| 2010/0264645 A1 | 10/2010 | Jones et al. |
| 2010/0273019 A1 | 10/2010 | Kitaike et al. |
| 2010/0297393 A1 | 11/2010 | Wu |
| 2010/0317506 A1 | 12/2010 | Fechner et al. |
| 2011/0014475 A1 | 1/2011 | Murata |
| 2011/0045219 A1 | 2/2011 | Stewart et al. |
| 2011/0062619 A1 | 3/2011 | Laine et al. |
| 2011/0091732 A1 | 4/2011 | Lu et al. |
| 2011/0098172 A1 | 4/2011 | Brix |
| 2011/0159318 A1 | 6/2011 | Endo et al. |
| 2011/0165393 A1* | 7/2011 | Bayne ............ C03C 15/02 428/215 |
| 2011/0177252 A1 | 7/2011 | Kanagasabapathy et al. |
| 2011/0177987 A1 | 7/2011 | Lenting et al. |
| 2011/0186464 A1 | 8/2011 | Carta et al. |
| 2011/0189486 A1 | 8/2011 | Wendell, Jr. |
| 2011/0200804 A1 | 8/2011 | Tomamoto et al. |
| 2011/0200805 A1 | 8/2011 | Tomamoto et al. |
| 2011/0226658 A1 | 9/2011 | Tata-Venkata et al. |
| 2011/0272322 A1* | 11/2011 | Yamagata ........ C03B 19/095 206/524.6 |
| 2011/0274916 A1 | 11/2011 | Murata |
| 2011/0313363 A1 | 12/2011 | D'Souza et al. |
| 2012/0016076 A1 | 1/2012 | Kim et al. |
| 2012/0034435 A1 | 2/2012 | Borrelli et al. |
| 2012/0052293 A1 | 3/2012 | Poe et al. |
| 2012/0061342 A1 | 3/2012 | Perrot |
| 2012/0097159 A1 | 4/2012 | Iyer et al. |
| 2012/0107174 A1 | 5/2012 | Zambaux |
| 2012/0148770 A1 | 6/2012 | Rong et al. |
| 2012/0172519 A1 | 7/2012 | Dörr et al. |
| 2012/0199203 A1 | 8/2012 | Nishizawa et al. |
| 2012/0251748 A1 | 10/2012 | Ashmead et al. |
| 2012/0282449 A1* | 11/2012 | Gross .............. C03C 17/28 428/220 |
| 2012/0297829 A1 | 11/2012 | Endo et al. |
| 2013/0011650 A1 | 1/2013 | Akiba et al. |
| 2013/0071078 A1 | 3/2013 | Bennett et al. |
| 2013/0095261 A1* | 4/2013 | Ahn .............. C03C 3/06 428/34.4 |
| 2013/0101792 A1 | 4/2013 | Pranov |
| 2013/0109116 A1 | 5/2013 | Cavuoti et al. |
| 2013/0122306 A1* | 5/2013 | Bookbinder ........ C03C 21/001 428/410 |
| 2013/0171456 A1* | 7/2013 | Fadeev .............. C03C 17/005 428/429 |
| 2013/0211344 A1 | 8/2013 | Rodriguez et al. |

(56) References Cited

U.S. PATENT DOCUMENTS

| | | | |
|---|---|---|---|
| 2013/0216742 A1* | 8/2013 | DeMartino | A61J 1/00 428/34.4 |
| 2013/0224407 A1 | 8/2013 | Fadeev et al. | |
| 2013/0299380 A1* | 11/2013 | Zambaux | A61L 2/26 206/525 |
| 2013/0327740 A1* | 12/2013 | Adib | C03C 3/087 215/379 |
| 2014/0001143 A1 | 1/2014 | Fadeev et al. | |
| 2014/0034544 A1* | 2/2014 | Chang | B65D 25/14 206/524.3 |
| 2014/0069202 A1* | 3/2014 | Fisk | A61M 5/3129 73/762 |
| 2014/0150499 A1* | 6/2014 | Danielson | B65D 25/14 65/31 |
| 2014/0151370 A1* | 6/2014 | Chang | C03C 17/005 220/62.15 |
| 2014/0220327 A1* | 8/2014 | Adib | C03C 17/36 428/217 |
| 2014/0339194 A1* | 11/2014 | Gu | C03C 15/02 216/97 |
| 2015/0107303 A1* | 4/2015 | Bookbinder | C03C 15/00 65/30.14 |
| 2016/0145150 A1* | 5/2016 | Bookbinder | C03C 15/00 65/31 |

FOREIGN PATENT DOCUMENTS

| | | |
|---|---|---|
| CN | 2483332 Y | 3/2002 |
| CN | 1963650 A | 5/2007 |
| CN | 101190969 A | 6/2008 |
| CN | 101479355 A | 7/2009 |
| CN | 201390409 Y | 1/2010 |
| CN | 201404453 Y | 2/2010 |
| CN | 101717189 A | 6/2010 |
| CN | 101831175 A | 9/2010 |
| CN | 201694531 U | 1/2011 |
| CN | 102066462 A | 5/2011 |
| CN | 202006114 U | 10/2011 |
| DE | 2138159 A1 | 2/1973 |
| DE | 4128634 A1 | 3/1993 |
| DE | 4130414 A1 | 4/1993 |
| DE | 29702816 U1 | 4/1997 |
| DE | 102004011009 A1 | 9/2005 |
| DE | 102011085267 A1 | 5/2013 |
| EP | 0176062 A1 | 4/1986 |
| EP | 0330456 A1 | 8/1989 |
| EP | 0515801 A1 | 12/1992 |
| EP | 1464631 A2 | 6/2004 |
| EP | 2031124 A1 | 3/2009 |
| EP | 0524802 B2 | 10/2009 |
| EP | 2540682 A1 | 1/2013 |
| FR | 93015 E | 1/1969 |
| FR | 2033431 A5 | 12/1970 |
| FR | 2515633 A1 | 5/1983 |
| GB | 702292 A | 1/1954 |
| GB | 720778 A | 12/1954 |
| GB | 966731 A | 8/1964 |
| GB | 1267855 A | 3/1972 |
| GB | 1529386 A | 10/1978 |
| IN | 231117 B | 3/2009 |
| JP | S49115088 A | 11/1974 |
| JP | 54054124 A | 4/1979 |
| JP | 56155044 A | 12/1981 |
| JP | S5767035 A | 4/1982 |
| JP | 60254022 A | 12/1985 |
| JP | 62047623 A | 3/1987 |
| JP | 62140257 A | 6/1987 |
| JP | S62172081 A | 7/1987 |
| JP | 63236731 A | 10/1988 |
| JP | H01201048 A | 8/1989 |
| JP | 1279058 A | 11/1989 |
| JP | H02153846 A | 6/1990 |
| JP | H0437632 A | 2/1992 |
| JP | 7223845 A | 8/1995 |
| JP | H083510 A | 1/1996 |
| JP | H08151564 A | 6/1996 |
| JP | H08245242 A | 9/1996 |
| JP | 11171593 A | 6/1999 |
| JP | 11314931 A | 11/1999 |
| JP | 2000007372 A | 1/2000 |
| JP | 2000219621 A | 8/2000 |
| JP | 2001033348 A | 2/2001 |
| JP | 2001180969 A | 7/2001 |
| JP | 2001192239 A | 7/2001 |
| JP | 2001229526 A | 8/2001 |
| JP | 2001236634 A | 8/2001 |
| JP | 2001294447 A | 10/2001 |
| JP | 2002003241 A | 1/2002 |
| JP | 2002249340 A | 9/2002 |
| JP | 2003128439 A | 5/2003 |
| JP | 2003146699 A | 5/2003 |
| JP | 2004161993 A | 6/2004 |
| JP | 2006291049 A | 10/2006 |
| JP | 2008195602 A | 8/2008 |
| JP | 2009108181 A | 5/2009 |
| JP | 2009523105 A | 6/2009 |
| JP | 2009207618 A | 9/2009 |
| JP | 2010059038 A | 3/2010 |
| JP | 2010202413 A | 9/2010 |
| JP | 2010274091 A | 12/2010 |
| JP | 2011001253 A | 1/2011 |
| JP | 2012180276 A | 9/2012 |
| KR | 1006303090000 | 9/2006 |
| RO | 83460 | 3/1984 |
| RU | 2220219 C1 | 12/2003 |
| SU | 722865 A1 | 3/1980 |
| SU | 990700 A | 1/1983 |
| SU | 1025680 A1 | 6/1983 |
| SU | 1293134 A1 | 2/1987 |
| TW | 201113233 A | 4/2011 |
| TW | 201213260 A | 4/2012 |
| WO | 1990005031 A1 | 5/1990 |
| WO | 1995010487 A1 | 4/1995 |
| WO | 1997025932 A1 | 7/1997 |
| WO | 2001017569 A2 | 3/2001 |
| WO | 2007016516 A2 | 2/2007 |
| WO | 2007097376 A1 | 8/2007 |
| WO | 2008050500 A1 | 5/2008 |
| WO | 2009002660 A2 | 12/2008 |
| WO | 2009095569 A1 | 8/2009 |
| WO | 2010129758 A1 | 11/2010 |
| WO | 2011047840 A2 | 4/2011 |
| WO | 2011069338 A1 | 6/2011 |
| WO | 2011073106 A1 | 6/2011 |
| WO | 2011080543 A1 | 7/2011 |
| WO | 2011103798 A1 | 9/2011 |
| WO | 2011145661 A1 | 11/2011 |
| WO | 2012026290 A1 | 3/2012 |
| WO | 2012076289 A2 | 6/2012 |
| WO | 2013063290 A1 | 5/2013 |
| WO | 2013130724 A2 | 9/2013 |
| WO | 2014005030 A1 | 1/2014 |
| ZA | 9706079 A | 3/1998 |

OTHER PUBLICATIONS

Keramid and Kerimide 601, Scifinder American Chemical Society (ACS) (2015); pp. 1-5.

Polyimide—Hawley's Condensed Chemical Dictionary—Wiley Online (2007); 1 Page.

Tyzor (Du Pont)—Hawley's Condensed Chemical Dictionary—Wiley Online (2007). 1 Page.

McKeen, L., "Fatigue and Tribological Properties of Plastics and Elastomers," 2d Ed 7 Polyimides, (2010); 25 Pages.

Non-Final Office Action dated Jul. 14, 2015 relating to U.S. Appl. No. 14/088,556, filed Nov. 25, 2013; pp. 1-17.

Schwarzenbach, et al., "Interferon a-2a interactions on Glass Vial Surfaces Measured by Atomic Force Microscopy", PDS J. Pharmaceutical Science and Technology, vol. 56, No. 2, Mar.-Apr. 2002, pp. 78-89.

Shelby, "Introduction to Glass Science and Technology", Royal Chemistry, Jan. 1, 2005—Technology & Engineering, p. 193.

(56) References Cited

OTHER PUBLICATIONS

Notice of Allowance dated Dec. 9, 2015 for U.S. Appl. No. 13/780,740, filed Feb. 28, 2013. pp. 1-15.
Non-Final Office Action dated Dec. 16, 2015 for U.S. Appl. No. 14/812,902, filed Jul. 29, 2015. pp. 1-25.
International Search Report and Written Opinion dated Nov. 20, 2015 for PCT/US2015/048592 filed Sep. 4, 2015. pp. 1-11.
Chao-Ching Chang et al., Synthesis and Optical Properties of Soluble Polyimide/Titania Hybrid Thin Films, Macromol. Mater. Eng., (2006), Issue 12, vol. 291, pp. 1521-1528.
Yang-Yen Yu, et al., High transparent polyimide/titanic multi-layer anti-reflective hybrid films, Thin Solid Films 519 (2011) 4731-4736.
Qiu, et al., "Morphology and size control of inorganic particles in polyimide hybrids by using SiO2—TiO2 mixed oxide", Polymer 44 (2003) 5821-5826.
Extended European Search Report dated Jan. 8, 2016 for EP Patent Application No. 15290254.0.
International Search Report & Written Opinion dated Feb. 2, 2016 for PCT/US2015/062169 filed Nov. 23, 2015. pp. 1-13.
Non-Final Office Action dated Feb. 10, 2016 for U.S. Appl. No. 14/812,898, filed Jul. 29, 2015.
Non-Final Office Action dated Feb. 10, 2016 for U.S. Appl. No. 13/780,754, filed Feb. 28, 2013.
Notice of Allowance dated Jan. 22, 2016 for U.S. Appl. No. 14/088,556, filed Nov. 25, 2013.
Non-Final Office Action dated May 19, 2016 for U.S. Appl. No. 14/812,902, filed Jul. 29, 2015. pp. 1-15.
Flaim, et al., "High Refractive Index Polymer Coatings for Optoelectronics Applications," Society of Photo-Optical Instrumentation for Engineers (2003), SPIE Proceedings of Optical Systems Design 2003. pp. 1-12.
Chinese 2nd Office Action & Search Report dated May 19, 2016 for CN Patent Application No. 201380022462.7. pp. 1-11.
Singapore Written Opinion dated May 4, 2016 for SG Patent Application No. 11201503964W. pp. 1-10.
Karlsson, S. et al., The technology of chemical glass strengthening—a review. Glass Technology: European of Journal Glass Science and Technology A, Apr. 30, 2010, vol. 51, No. 2, pp. 41-54.
Singapore Written Opinion dated May 4, 2016 for SG Patent Application No. 11201504033T. pp. 1-9.
Liu, Y.H. et al., Tunable water-based lubrication behavior of alkyl- and fluoroalkyl-silanes, Chinese Science Bulletin, May 31, 2012, vol. 57, No. 15, pp. 1879-1885. doi: 10.1007/s11434-012-5106-2.
Cichomski, M. et al., Investigation of the structure of fluoroalkylsilanes deposited on alumina surface, Applied Surface Science, Jun. 18, 2012, vol. 258, No. 24, pp. 9849-9855.
Kimble Chase, 2008-2009 Catalog (International Edition), p. p. 26-60.
Non-Final Office Action dated Jun. 15, 2016 for U.S. Appl. No. 13/780,754, filed Feb. 28, 2011. pp. 1-25.
Non-Final Office Action dated Jun. 15, 2016 for U.S. Appl. No. 14/812,898, filed Jul. 29, 2015. pp. 1-24.
Australian first Examination Report dated Mar. 4, 2016 for AU Patent Application No. 2013271436. pp. 1-4.
Singapore Written Opinion dated Feb. 23, 2016 for SG Patent Application No. 11201504070P. pp. 1-9.
Non-Final Offce Action dated Mar. 23, 2016 for U.S. Appl. No. 13/827,732, filed Mar. 14, 2013. pp. 1-28.
Yashchishin, et al., "Homogeneity and lamination of sheet glass," L'vov Mechanized Glass Works, Translated from Steklo i Keramika, No. 4, Apr. 1978, p. 192-194.
Cerdan-Diaz, et al., "Improving chemical durability and resistance to corrosion/delamination through chemistry enhancement in glass manufacturing," Glass Delamination Scientific Symposium, May 25, 2011, Arlington, VA, p. 1-29.
Non-Final Office Action dated Mar. 9, 2016 for U.S. Appl. No. 13/912,457, filed Jun. 7, 2013. pp. 1-31.
"DuPont Teflon PFA TE-7224 Aqueous Fluoropolymers made with Echelon Dispersion Technology" [online]. Dupont, 2006. Retrieved from the Internet: <URL: http://www2.dupont.com/Teflon_Industrial/en_US/assets/downloads/k15758.pdf>.
"Spectroscopic Ellipsometry Methods for Thin Absorbing Coatings", by Hilfiker et al. from Society of Vacuum Coaters 505/856-7188, pp. 511-516, 51st Annual Technical Conference Proceedings, Chicago, IL, Apr. 19-24, 2008.
"Thermal Stability of the Silica-Aminopropylsilane-Polyimide Interface", Linde, et al. Journal of Polymer Science, Polymer Chemistry Edition, vol. 22, 3043-3062, John Wiley & Sons, Inc. (1984).
Anderson, et al., "Polyimide-Substrate Bonding Studies Using γ-APS Coupling Agent", IEEE Transactions on Components, Hybrids, and Manufacturing Technology, vol. CHMT-9, No. 4, p. 364-369, Dec. 1986.
Benitez, et al., "SiOx-SiNx functional coatings by PECVD of organosilicon monomers other than silane", Annual Technical Conference Proceedings—Society of Vacuum Coaters (2002), 45th, 280-285; ISSN: 0731-1699.
Cho, et al. "Adhesion behavior of PDMS-containing polyimide to glass", Journal of Adhesion Science and Technology 12:3, pp. 253-269, Taylor & Francis (1998), DOI: 10.1163/156856198X00867.
De Rosa, et al., "Scratch Resistant Polymide Coatings for Aluminosilicate Glass Surfaces", The Journal of Adhesion, 78: 113-127, Taylor & Francis (2002), ISSN: 0021-8464.
Dow Coming, "A Guide to Silane Solutions: Fiberglass and Composites", Silicones Simplified [online]. Dow Corning corporation, 2009. Retrieved from the Internet: <URL: https://www.xiameter.com/en/ExploreSilicones/Documents/95-728-01%20Fiberglass%20and%20Composites.pdf>.
Dow Corning, Resins and Intermediates Selection Guide; Paints & Inks Solutions, p. 1-8, 2010.
Ennis, et al., "Glass Vials for Small Volume Parenterals: Influence of drug and manufacturing process on glass delamination," Pharmaceutical Development and Technology, 6(3): p. 393-405, (2001).
Francen, et al., "Fluorochemical glass treatments", The Glass Industry (1965), 46(10), 594-7; 628-9; ISSN: 0017-1026.
G. L. Witucki, "A Silane Primer: Chemistry and Applications of Alkoxy Silanes", Journal of Coatings Technology, (vol. 65) pp. 57-60, Federation of Societies for Coatings Technology, Blue Bell, Pennsylvania (Jul. 1993).
Gelest, Inc., MSDS, Material Safety Data Sheet, Aminopropylsilsesquioxane Oligomer, 22-25%—WSA-9911 [online]. Gelest, Inc. Morrisville, PA, 2008. Retrieved from the Internet: <URL: http://shop.gelest.com/Product.aspx?catnum=WSA-9911&Index=0&TotalCount=1>.
Guadagnino, et al., "Delamination Propensity of Pharmaceutical Glass Containers by Accelerated Testing with Different Extraction Media," PDA Journal of Pharmaceutical Science and Technology, Mar. / Apr. 2012, vol. 66, No. 2,116-125. DOI: 10.5731/pdajpst.2012.00853.
Iacocca, et al., "Corrosive attack of glass by a pharmaceutical compound," Journal of Materials Science, 42:801-811, Springer Science+Business Media, LLC (2007), DOI: 10.1007/s10853-006-0156-y.
Iacocca, et al., "Factors Affecting the Chemical Durability of Glass Used in the Pharmaceutical Industry", AAPS PharmSciTech, vol. 11, No. 3, pp. 1340-1349, Sep. 2010.
Jiang, et al., "Novel Mechanism of Glass Delamination in Type 1A Borosilicate Vials Containing Frozen Protein Formulations", PDA Journal of Pharmaceutical Science and Technology, Jul. / Aug. 2013, vol. 67, No. 4, 323-335.
Jin, et al., "Preparation and characterization of poly(phthalazinone ether ketone)/SiO2 hybrid composite thin films with low friction coefficient", Journal of Sol-Gel Science and Technology, Springer Science+Business Media, LLC (2008), 46(2), 208-216; ISSN: 0928-0707.
Jin, et al., "Preparation and investigation of the tribological behavior of poly(phthalazinone ether keytone)/silica thin films", Chinese Journal of Materials Research. vol. 22, No. 1, pp. 26-30. Feb. 25, 2008. ISSN: 1005-3093. Published by: Chinese Academy of Sciences, No. 1, Beijing, China.

(56) References Cited

OTHER PUBLICATIONS

Metwalli et al., Journal of Colloid and Interface Science 298 (2006) 825-831.
Poe, et al., "Zero CTE polyimides for athermal optical membranes", Proceedings of SPIE, vol. 7061, Issue: Novel Optical Systems Design and Optimization XI, pp. 706114/1-706114/9, Journal, 2008, Publisher: Society of Photo-Optical Instrumentation Engineers, ISSN: 0277-786X.
Rupertus, V., "PDA Europe Thanks Universe of Pre-Filled Syringes: Two ways to minimize the delamination risk of glass containers," P&M—EU; PDA Letter, p. 42-23, Jan. 2012.
Schmid, et al., "Recommendations on Delamination Risk Mitigation & Prediction for Type I Pharmaceutical Containers Made of Tubing Glass", Nuova Ompi: Glass Division, p. 40-42, Frederick Furness Publishing (2012).
Schmid, et al., "Glass Delamination: Facts—Prevention—Recommendations", Stevanato Group Market Update, News Issue 5, May 2011, p. 1-4.
Schwarzenbach, et al., "Topological Structure and Chemical Composition of Inner Surfaces of Borosilicate Vials," PDA Journal of Pharmaceutical Science and Technology, May /Jun. 2004, vol. 58, No. 3, 169-175.
Sloey, et al., "Determining the Delamination Propensity of Pharmaceutical Glass Vials Using a Direct Stress Method," PDA Journal of Pharmaceutical Science and Technology, Jan. / Feb. 2013, vol. 67, No. 1, 35-42. DOI: 10.5731/pdajpst.2013.00900.
Smay, G. L., "The characteristics of high-temperature resistant organic polymers and the feasibility of their use as glass coating materials", Journal of Materials Science, 20 (4), pp. 1494-1500, Chapman & Hall Ind. (1985), ISSN: 0022-2461.
U.S. Department of Health & Human Services, "Advisory to Drug Manufactures: Formation of Glass Lamellae in Certain Injectable Drugs" [online] U.S. Food & Drug Administration, Mar. 25, 2011, retrieved from the Internet: <URL: http://www.fda.gov/Drugs/DrugSafety/ucm248490.htm>.
Wagner, C., "PDA/FDA Glass Quality Conference: an alternative glass packing solution to reduce delamination risks," [PowerPoint Presentation] PDA/FDA Glass Quality Conference, Washington, D.C., Jun. 4-5, 2012.
Wahab, et al., "Silica- and Silsesquioxane-Containing Polymer Nanohybrids", Macromolecules Containing Metal and Metal-Like Elements, vol. 4: Group IVA Polymers, Chapter 6, 2005 John Wiley & Sons, Inc.
Walther, et al., "Pharmaceutical Vials with Extremely High Chemical Inertness" [online], PDA Journal of Pharmaceutical Science and Technology, May / Jun. 2002, vol. 56, No. 3, 124-129 (abstract); retrieved from the Internet: <URL: http://journal.pda.org/content/56/3/124.abstract>.
International Search Report & Written Opinion dated Oct. 28, 2013 for International Patent Application No. PCT/US2013/028187 filed Feb. 28, 2013.
Huang, et al., "Cubic silsesquioxane-polymide nanocomposites with improved thermomerchanical and dielectric properties", Acta Materialia, Elsevier, vol. 53, No. 8, pp. 2395-2404, May 1, 2005; ISSN: 1359-6454.
International Search Report & Written Opinion dated Oct. 28, 2013 for International Patent Application No. PCT/US2013/048589 filed Jun. 28, 2013.
International Search Report & Written Opinion dated Jan. 16, 2014 for International Patent Application No. PCT/US2013/066370 filed Oct. 23, 2013.
Pantano, Carlo G.,"The Role of Coatings and Other Surface Treatments in the Strength of Glass", [online], Department of Materials Science and Engineering Materials Research Institute, The Pennsylvania State University, University Park, PA. 2009. Retrieved from the Internet: <URL: http://www.gmic.org/Strength%20In%20Glass/Pantano%20Pac%20Rim.pdf>. pp. 1-55.
ASTM, "Standard Specification for Glasses in Laboratory Apparatus," Designation E438-92 (Reapproved 2006). Retrieved from the Internet: <URL: http://enterprise2.astm.org/DOWNLOAD/E438-92R06.1656713-1.pdf>. p. 1.
International Search Report & Written Opinion dated Feb. 26, 2014 for International Patent Application No. PCT/US2013/071437 filed Nov. 22, 2013.
International Search Report & Written Opinion dated Feb. 26, 2014 for International Patent Application No. PCT/US2013/071447 filed Nov. 22, 2013.
International Search Report & Written Opinion dated Feb. 26, 2014 for International Patent Application No. PCT/US2013/071460 filed Nov. 22, 2013.
International Search Report & Written Opinion dated Feb. 26, 2014 for International Patent Application No. PCT/US2013/071473 filed Nov. 22, 2013.
International Search Report & Written Opinion dated May 6, 2014 for International Patent Application No. PCT/US2013/071776 filed Nov. 26, 2013.
J. Watjen, et al. "The Certification of a Reference Material for the Determination of the Alkali Leaching From Pharmaceutical Glass Containers IRMM-435", May 4, 2007, XP055114934, Retrieved from the Internet: URL: http:// www.irmm.jrc.be/html/reference_materials_catalogue/catalogue/attachments/IRMM-435_report.pdf.
U.S. Pharmacopeial Convention Medicines Compendium,"<660> Containers-Glass" [online], (2014). Retrieved from the Internet: <URL: https://mc.usp.org/general-chapters>. pp. 1-5.
Ciullo, P.A., Industrial Minerals and Their Uses—A Handbook and Formulary. William Andrew Publishing/Noyes, (1996). ISBN: 0-8155-1408-5. Online version available at: <URL: http://app.knovel.com/hotlink/toc/id:kpIMTUAHFB/industrial-minerals-their/industrial-minerals-their>. pp. 1-7.
Plueddemann, Edwin, "Silane Coupling Agents," Springer Science+Business Media, LLC (1982). ISBN: 978-1-4899-0344-0. pp. 1-18.
Hawley's Condensed Chemical Dictionary Melting Points, 2007. pp. 1-5.
Non-Final Office Action dated Aug. 23, 2016 for U.S. Appl. No. 14/075,630 filed Nov. 8, 2013. pp. 1-11.
Non-Final Office Action dated Sep. 28, 2016 for U.S. Appl. No. 14/075,620, filed Nov. 8, 2013. pp. 1-28.
Non-Final Office Action dated Sep. 27, 2016 for U.S. Appl. No. 14/812,902, filed Jul. 29, 2015. pp. 1-37.
Choi, et al., "Organic/Inorganic Imide Nanocomposites from Aminophenylsilsesquioxanes", American Chemical Society, (2003), Chem. Mater. 15, 3365-3375.
Non-Final Office Action dated Oct. 5, 2016, for U.S. Appl. No. 13/930,647, filed Jun. 28, 2013. pp. 1-30.
Non-Final Office Action dated Jan. 12, 2017, for U.S. Appl. No. 14/812,898, filed Jul. 29, 2015. pp. 1-44.
English Machine Translation of detailed description of DE 102004011009 published Sep. 29, 2005; Machine Translation acquired on Jan. 8, 2016. pp. 1-11.
Hasegawa et al., "Photophysics, photochemistry, and optical properties of polyimides", Elsevier Science Ltd; Prog. Poly. Sci. 26 (2001), pp. 259-335.
Non-Final Office Action dated Feb. 15, 2017, for U.S. Appl. No. 13/780,740, filed Feb. 28, 2013. pp. 1-39.
Non-Final Office Action dated Jan. 24, 2017, for U.S. Appl. No. 15/331,113, filed Oct. 21, 2016. pp. 1-50.
"Parylene Conformal Coating Specification and Properties", acquired from http://www.nbtc.cornell.edu/sites/default/files/Parylene%20Information%20Sheets.pdf on Dec. 20, 2016.
Rx-360 Consortium; "Highlights from Jun. 2011 Glass Container Delamination Scientific Symposium"; Report published Jul. 9, 2011; pp. 1-13.
Non-Final Office Action dated Feb. 22, 2017, for U.S. Appl. No. 13/827,732, filed Mar. 14, 2013. pp. 1-34.
Jannotti et al. "Photoelastic Measurement of High Stress Profiles in Ion-exchanged Glass", Int. J. Appl. Glass Sci., 2011, vol. 2, p. 275-281.

(56) References Cited

OTHER PUBLICATIONS

Canadian Official Action dated Mar. 6, 2017 for CA Patent Application No. 2,864,919. pp. 1-4.
Japanese 1st Office Action dated Feb. 21, 2017, for JP Patent Application No. 2014-558980; pp. 1-6.
Chinese 1st Office Action & Search Report dated Feb. 20, 2017 for CN Patent Application No. 201380062549.7; pp. 1-11.
Non-Final Office Action dated Mar. 9, 2017 for U.S. Appl. No. 15/331,120, filed Oct. 21, 2016; pp. 1-43.
"Schott Technical Glasses: Physical and Technical Properties" acquired from http://www.us.schott.com/tubing/english/download/schott-brochure-technical-glasses_us.pdf on Jan. 17, 2017. pp. 1-76.
Non-Final Office Action dated Mar. 8, 2017 for U.S. Appl. No. 13/912,457, filed Jun. 7, 2013. pp. 1-34.
Non-Final Office Action dated Mar. 21, 2017 for U.S. Appl. No. 14/075,630, filed Nov. 8, 2013. pp. 1-35.
Non-Final Office Action dated Apr. 6, 2017 for U.S. Appl. No. 14/812,902, filed Jul. 29, 2015. pp. 1-43.
Non-Final Office Action dated Apr. 18, 2017, for U.S. Appl. No. 15/374,338, filed Dec. 9, 2016. pp. 1-45.
Non-Final Office Action dates Mar. 29, 2017 for U.S. Appl. No. 13/780,754, filed Feb. 28, 2013. pp. 1-41.
Non-Final Office Action dated May 30, 2017 for U.S. Appl. No. 14/075,620, filed Nov. 8, 2013. pp. 1-61.
Non-Final Office Action dated May 31, 2017 for U.S. Appl. No. 14/075,593, filed Nov. 8, 2013. pp. 1-51.
English Translation of Taiwan Official Communication dated Apr. 17, 2017 & Search Report dated Feb. 20, 2017, for TW Patent Application No. 102143473. pp. 1-3.
English Translation of Japanese Office Action dated May 30, 2017 for JP Patent Application No. 2015-520574. pp. 1-9.
SCHOTT North America, Inc., "Schott Type 1 plus: SiO2 coating resists delamination" [online], SCHOTT North America, Inc., retrieved from the internet: <URL: http://www.us.schott.com/pharmaceutical_packaging/english/download/flyer_type_i_plus_us.pdf>.
European Pharmacopeia, 5th edition, 3.2 Containers, [online]. Retrieved from the Internet: <URL: http://pharmacyebooks.com/2009/09/european-pharmacopoeia-5-0-online.html>. 4 Pages, (2005).
Wagner, Steven Robert, "High temperature-high humidity for polyimide coatings for aluminosilicate glass surfaces"; The Libraries at Alfred University; Scholes Library Catalog; (2001), pp. 1-81; OCLC: 671453753.
Russian Official Communication and Search Report dated Jun. 5, 2017 for RU Patent Application No. 2014154053. pp. 1-9.
Borba s rasslaivaniem stekla v farmatsevticheskoy upakovke (Glass delamination control in a pharmaceutical package). Henning Katte. Glass International, May 2012. pp. 25-30.
Taiwan Search Report dated May 20, 2017 for TW Patent Application No. 102143475. pp. 1-2.
Japanese 1st Office Action dated Sep. 26, 2017, for JP Patent Application No. 2015-545127. pp. 1-18.
Russian 1st Office Action and Search Report dated Oct. 25, 2017, for RU Patent Application No. 2015125706. pp. 1-12.
Notice of Allowance dated Nov. 7, 2017, for U.S. Appl. No. 13/780,754. pp. 1-14.
Liu et al., "Influences of heating temperature on mechanical properties of polydimethylsiloxane", Sensors and Actuators A: Physical, 2009, vol. 151, pp. 42-45.
Japanese 1st Office Action dated Oct. 24, 2017, for Japanese Patent Application No. 2015-545160. pp. 1-8.
Russian 1st Office Action and Search Report and English Translation dated Nov. 10, 2017 for RU Patent Application No. 2015125912. pp. 1-16.
Russian Decision of Grant dated Nov. 8, 2017, for RU Patent Application No. 2014138998. pp. 1-20.
Russian 1st Office Action and Search Report and English Translation dated Oct. 27, 2017, for RU Patent Application No. 2015125783. pp. 1-13.
English Translation of Taiwan 2nd Office Action & Search Report dated Dec. 4, 2017, for TW Patent Application No. 102143473. pp. 1-2.
Korean 1st Office Action and English Translation dated Dec. 14, 2017, for KR Patent Application No. 2015-7017413. pp. 1-10.
Russian 1st Office Action & Search Report and English Translation dated Oct. 27, 2017, for RU Patent Application No. 2015125913. pp. 1-13.
Japanese 1st Office Action dated Nov. 14, 2017, for JP Patent Application No. 2015-545129. pp. 1-8.
Non-Final Office Action dated Feb. 9, 2018, for U.S. Appl. No. 15/331,120, filed Oct. 21, 2016. pp. 1-26.
FIOLAX clear technical data sheet acquired from http://www.us.schott.com/d/tubing/7c1860b0-5313-4d48-a12f-fa1ac06bc4a9/schott-tubing-datasheet-fiolax-clear-english.pdf. Originally published online Feb. 2010. pp. 1-3.

* cited by examiner

METHODS FOR PRODUCING STRENGTHENED AND DURABLE GLASS CONTAINERS

CROSS-REFERENCE TO PRIOR APPLICATIONS

This application claims priority to U.S. Provisional Application No. 62/084,877, filed on Nov. 26, 2014, and is incorporated herein in its entirety.

BACKGROUND

Field

The present specification generally relates to methods for forming glass containers and, more specifically, to methods of forming glass containers such that the glass containers are resistant to delamination and damage.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical compositions contained therein. Glasses having suitable chemical durability include those glass compositions within the ASTM standard E438.92 'Type IA' and 'Type IB' glass compositions which have a proven history of chemical durability. In general terms, chemically durable glasses are glasses whose constituent components do not dissolve from the glass when the glass is exposed to a solution for extended periods of time.

Although Type IA and Type IB glass compositions are commonly used in pharmaceutical packages due to their chemical durability, they do suffer from several deficiencies, including a tendency for the interior surfaces of the pharmaceutical package to shed glass particulates or "delaminate" following exposure to pharmaceutical solutions.

Accordingly, a need exists for alternative glass containers that exhibit a reduced propensity to delaminate

SUMMARY

According to one embodiment, a method of forming a glass container comprises: forming a glass container comprising a sidewall at least partially enclosing an interior volume, at least a portion of an interior surface of the sidewall having an interior surface layer; and contacting the glass container with a substantially fluoride-free aqueous treating medium to remove a thin layer of the interior surface layer having a thickness of from about 100 nm to about 1.0 µm from the interior surface of the sidewall. The interior surface of the sidewall is resistant to delamination.

In another embodiment, a method of forming a glass container comprises: forming a glass container comprising a sidewall at least partially enclosing an interior volume, the sidewall having an exterior surface comprising an exterior surface layer; and contacting the glass container with a substantially fluoride-free aqueous treating medium to remove a thin layer of the exterior surface layer having a thickness of from about 100 nm to about 1.0 µm from the exterior surface of the sidewall. Before contacting the glass container with the substantially fluoride-free aqueous treating medium, the exterior surface of the sidewall comprises strength-limiting surface flaws having a first shape, and after the contacting the exterior surface of the sidewall with the substantially fluoride-free aqueous treating medium, the strength-limiting surface flaws have a second shape.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
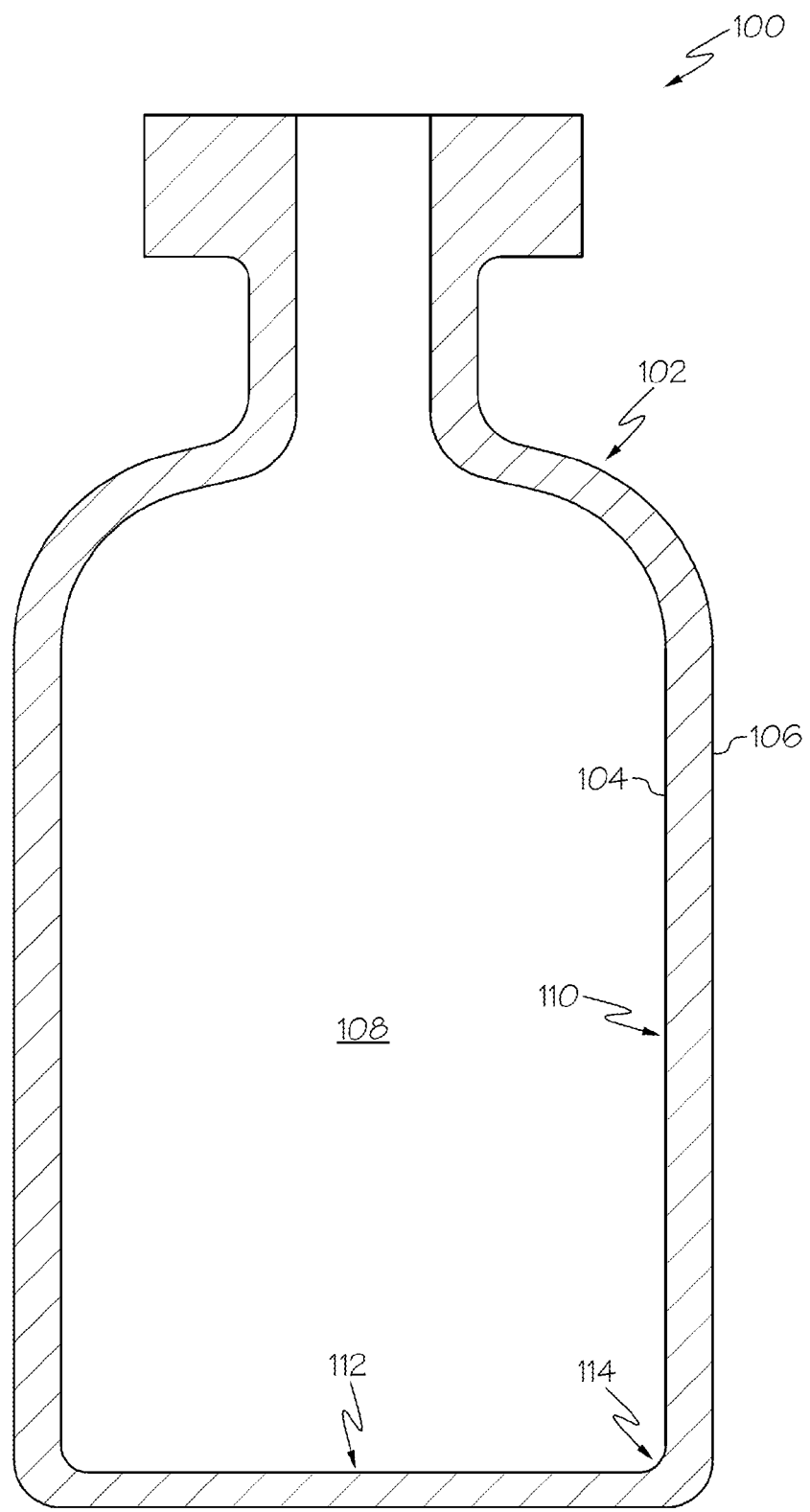
FIG. 1 schematically depicts a cross section of a glass container, specifically a glass vial, according to one or more embodiments described herein.

Reference will now be made in detail to various embodiments of methods of forming glass containers which have improved resistance to delamination and strength, examples of which are illustrated in the accompanying drawings. Whenever possible, the same reference numerals will be used throughout the drawings to refer to the same or like parts. In one embodiment, a method of forming a glass container comprises: forming a glass container comprising a sidewall at least partially enclosing an interior volume, at least a portion of an interior surface of the sidewall having an interior surface layer; and contacting the glass container with a substantially fluoride-free aqueous treating medium to remove a thin layer of the interior surface layer having a thickness of from about 100 nm to about 1.0 µm from the interior surface of the sidewall. In another embodiment, a method of forming a glass container comprises: forming a glass container comprising a sidewall at least partially enclosing an interior volume, the sidewall having an exterior surface comprising an exterior surface layer; and contacting the glass container with a substantially fluoride-free aqueous treating medium to remove a thin layer of the exterior surface layer having a thickness of from about 100 nm to about 1.0 µm from the exterior surface of the sidewall. Before contacting the glass container with the substantially fluoride-free aqueous treating medium, the exterior surface of the sidewall comprises strength-limiting surface flaws having a first shape, and after the contacting the exterior surface of the sidewall with the substantially fluoride-free aqueous treating medium, the strength-limiting surface flaws have a second shape. The methods of forming glass containers that are resistant to delamination and the properties of the glass containers will be described in more detail herein with specific reference to the appended drawings.

The term "chemical durability," as used herein, refers to the ability of the glass composition to resist degradation upon exposure to specified chemical conditions. Specifically, the chemical durability of the glass compositions described herein was assessed according to 3 established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." Each standard and the classifications within each standard are described in further detail herein. Alternatively, the chemical durability of a glass composition may be assessed according to USP <660> entitled "Surface Glass Test," and/or European Pharmacopeia 3.2.1 entitled "Glass Containers For Pharmaceutical Use" which assess the durability of the surface of the glass.

Conventional glass containers or glass packages for containing pharmaceutical compositions are generally formed from glass compositions that are known to exhibit chemical durability and low thermal expansion, such as Type IB alkali borosilicate glasses. While alkali borosilicate glasses exhibit good chemical durability, container manufacturers have observed silica-rich glass flakes dispersed in the solution contained in the glass containers. This phenomena is referred to herein as delamination. Delamination occurs particularly when the solution has been stored in direct contact with the glass surface for long time periods (months to years). Accordingly, a glass which exhibits good chemical durability may not necessarily be resistant to delamination.

Delamination refers to a phenomenon in which glass particles are released from the surface of the glass following a series of leaching, corrosion, and/or weathering reactions. In general, the glass particles are silica-rich flakes of glass which originate from the interior surface of the container as a result of the leaching of modifier ions into a solution contained within the container. These flakes may generally be from about 1 nm to about 2 µm thick with a width greater than about 50 µm. As these flakes are primarily composed of silica, the flakes generally do not further degrade after being released from the surface of the glass.

It has heretofore been hypothesized that delamination is due to phase separation which occurs in alkali borosilicate glasses when the glass is exposed to the elevated temperatures used for reforming the glass into a container shape. However, it is now believed that the delamination of the silica-rich glass flakes from the interior surfaces of the glass containers is due to the compositional characteristics of the glass container in its as-formed condition. Specifically, the high silica content of alkali borosilicate glasses causes the glass to have relatively high melting and forming temperatures. However, the alkali and borate components in the glass composition melt and/or vaporize at much lower temperatures. In particular, the borate species in the glass are highly volatile and evaporate from the surface of the glass at the high temperatures necessary to form and reform the glass.

Specifically, glass stock, such as a glass tube or the like, is reformed into glass containers at high temperatures and in direct flames. The high temperatures needed at higher equipment speeds cause the more volatile borate species to evaporate from portions of the surface of the glass. When this evaporation occurs within the interior volume of the glass container, the volatilized borate species are re-deposited in other areas of the glass container surface causing compositional heterogeneities in the glass container surface, particularly with respect to the near-surface regions of the interior of the glass container (i.e., those regions at or directly adjacent to the interior surfaces of the glass container).

Referring to FIG. 1 by way of example, a glass container, such as a glass container for storing a pharmaceutical composition, is schematically depicted in cross section. The glass container 100 generally comprises a glass article with a glass body 102. The glass body 102 extends between an interior surface 104 and an exterior surface 106 and generally encloses an interior volume 108. In the embodiment of the glass container 100 shown in FIG. 1, the glass body 102 generally comprises a wall portion 110 and a floor portion 112. The wall portions 110 and the floor portion 112 may generally have a thickness in a range from about 0.5 mm to about 3.0 mm. The wall portion 110 transitions into the floor portion 112 through a heel portion 114. The interior surface 104 and floor portion 112 are uncoated (i.e., they do not contain any inorganic coatings or organic coatings and, as such, the contents stored in the interior volume 108 of the glass container 100 are in direct contact with the glass from which the glass container 100 is formed. While the glass container 100 is depicted in FIG. 1 as having a specific shape form (i.e., a vial), it should be understood that the glass container 100 may have other shape forms, including, without limitation, vacutainers, cartridges, syringes, syringe barrels, ampoules, bottles, flasks, phials, tubes, beakers, or the like.

As noted herein, the glass container 100 may be formed by converting a glass tube into the container shape. For example, as one end of a glass tube is heated to close the glass tube and form the bottom or floor portion 112 of the container 100, more highly volatile species, such as borate species and/or alkali species or the like, may evaporate from the bottom portion of the tube and be re-deposited elsewhere in the tube. The evaporation of material from the heel and floor portions of the container is particularly pronounced as these areas of the container undergo the most extensive re-formation and, as such, are exposed to the highest temperatures. As a result, the areas of the container exposed to higher temperatures, such as the floor portion 112, may have silica-rich surfaces. Other areas of the interior surface 104 of the container which are amenable to deposition of the volatilized species, such as the wall portion 110, may have an interior surface layer 105 (schematically depicted in FIG. 2) formed by the condensation of the volatilized species and, as such, the surface is silica-poor. For example, in the case of borate species, areas amenable to boron deposition which are at a temperature greater than the anneal point of the glass composition but less than the hottest temperature the glass is subjected to during reformation can lead to boron incorporation on the surface of the glass.

Figure 2:
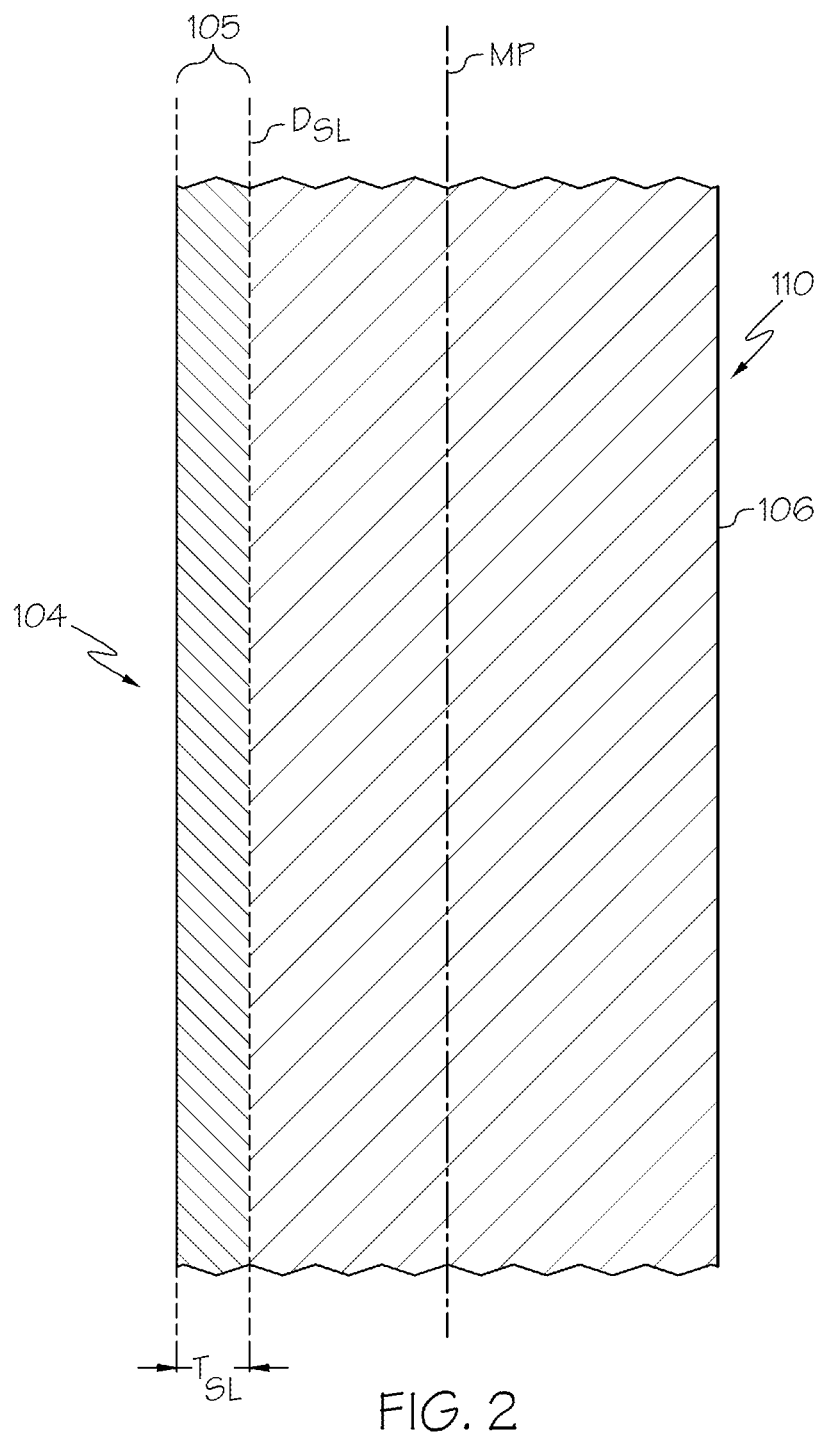
FIG. 2 schematically depicts a portion of the sidewall of the glass container of FIG. 1 prior to removal of the interior surface layer according to one or more embodiments described herein.

Referring now to FIGS. 1 and 2, the embodiment shown in FIG. 2 schematically depicts the interior surface 104 of a portion of a glass container 100, including the interior surface layer 105 which includes deposited volatilized species. The composition of the interior surface layer 105 is different than the composition of the glass deeper in the wall portion, such as at the midpoint MP of the wall portion 110. Specifically, FIG. 2 schematically depicts a partial cross section of a wall portion 110 of the glass container 100 of FIG. 1. The glass body 102 of the glass container 100 includes an interior surface layer 105 which extends from the interior surface 104 of the glass container 100 into the thickness of the wall portion 110 to a depth $D_{SL}$ from the interior surface 104 of the glass container. The glass composition within the interior surface layer 105 has a persistent layer heterogeneity relative to the glass at the midpoint MP of the wall portion and, as such, it should be understood that the composition of the glass in the interior surface layer 105 is different than the glass at the midpoint MP of the wall portion 110. In some embodiments, the thickness $T_{SL}$ of the interior surface layer is at least about 30 nm. In some embodiments, the thickness $T_{SL}$ of the interior surface layer is at least about 50 nm. In some embodiments, the thickness $T_{SL}$ of the interior surface layer is at least about 100 nm. In some embodiments, the thickness $T_{SL}$ of the interior surface layer is at least about 150 nm. In some other embodiments, the thickness $T_{SL}$ of the interior surface layer is at least about 200 nm or even about 250 nm. In some other embodiments, the thickness $T_{SL}$ of the interior surface layer is at least about 300 nm or even about 350 nm. In yet other embodiments, the thickness $T_{SL}$ of the interior surface layer is at least about 500 nm. In some embodiments, the interior surface layer may extend to a thickness $T_{SL}$ of at least about 1 µm or even at least about 2 µm.

In the embodiments described herein, the phrase "persistent layer heterogeneity" means that the concentration of the constituent components (e.g., $SiO_2$, $Al_2O_3$, $Na_2O$, etc.) of the glass composition in the interior surface layer 105 vary from the concentration of the same constituent components at the midpoint of a thickness of the glass body (i.e., at a point along the midpoint line MP which evenly bisects the glass body between the interior surface 104 and the exterior surface 106) by an amount which would result in delamination of the glass body upon long term exposure to a solution contained within the glass container. In the embodiments described herein, the persistent layer heterogeneity in the interior surface layer of the glass body is such that an extrema (i.e., the minimum or maximum) of a layer concentration of each of the constituent components of the glass composition in the interior surface layer 105 is less than about 92% or greater than about 108% of the same constituent component at a midpoint of a thickness of the glass body when the glass container 100 is in as-formed condition. In other embodiments, the persistent layer heterogeneity in the interior surface layer 105 of the glass body is such that the extrema of the layer concentration of each of the constituent components of the glass composition in the interior surface layer 105 is less than about 90% or greater than about 110% of the same constituent component at the midpoint of the thickness of the glass body when the glass container 100 is in as-formed condition. In still other embodiments, the persistent layer heterogeneity in the interior surface layer 105 of the glass body is such that the extrema of the layer concentration of each of the constituent components of the glass composition in the interior surface layer 105 is less than about 80% or greater than about 120% of the same constituent component at the midpoint of the thickness of the glass body when the glass container 100 is in as-formed condition. In some embodiments, the persistent layer heterogeneity is exclusive of constituent components of the glass composition which are present in an amount less than about 2 mol. %. The persistent layer heterogeneity is also exclusive of any water which may be present in the glass composition.

In the embodiments described herein, the phrase "persistent layer homogeneity" means that the concentration of the constituent components (e.g., $SiO_2$, $Al_2O_3$, $Na_2O$, etc.) of the glass composition in the interior region do not vary from the concentration of the same constituent components at the midpoint of a thickness of the glass body (i.e., at a point along the midpoint line MP which evenly bisects the glass body between the modified interior surface 104" and the exterior surface 106) by an amount which would result in delamination of the glass body upon long term exposure to a solution contained within the glass container. In the embodiments described herein, the persistent layer homogeneity in the interior region of the glass body is such that an extrema (i.e., the minimum or maximum) of a layer concentration of each of the constituent components of the glass composition in the interior region 120 is greater than or equal to about 80% and less than or equal to about 120% of the same constituent component at a midpoint of a thickness of the glass body after the interior surface layer with the persistent layer heterogeneity has been removed from the glass container. In other embodiments, the persistent layer homogeneity in the interior region of the glass body is such that the extrema of the layer concentration of each of the constituent components of the glass composition in the interior region 120 is greater than or equal to about 90% and less than or equal to about 110% of the same constituent component at the midpoint of the thickness of the glass body after the interior surface layer with the persistent layer heterogeneity has been removed from the glass container. In still other embodiments, the persistent layer homogeneity in the interior region of the glass body is such that the extrema of the layer concentration of each of the constituent components of the glass composition in the interior region 120 is greater than or equal to about 92% and less than or equal to about 108% of the same constituent component at the midpoint of the thickness of the glass body after the interior surface layer with the persistent layer heterogeneity has been removed from the glass container. In some embodiments, the persistent layer homogeneity is exclusive of constituent components of the glass composition which are present in an amount less than about 2 mol. %. The persistent layer homogeneity is also exclusive of any water which may be present in the glass composition.

The term "as-formed condition," as used herein, refers to the composition of the glass container 100 after the glass container has been formed from glass stock but prior to the container being exposed to any additional processing steps, such as ion-exchange strengthening, coating, ammonium sulfate treatment, acid etching, and/or any other surface modifications. In the embodiments described herein, the layer concentration of the constituent components in the glass composition is determined by collecting a composition sample through the thickness of the glass body in the area of interest using dynamic secondary ion mass spectroscopy ("D-sims"). In the embodiments described herein, the composition profile is sampled from areas of the interior surface 104 of the glass body 102. The sampled areas have a maximum area of 1 $mm^2$. This technique yields a compositional profile of the species in the glass as a function of depth from the interior surface of the glass body for the sampled area.

When the glass container is formed from a borosilicate glass composition (such as a Type IB glass composition), the presence of the interior surface layer 105 containing deposited volatile species may also be ascertained qualitatively. Specifically, the glass container 100 may be filled with a solution of methylene blue dye. The methylene blue dye reacts with and chemically bonds to the boron-rich regions of the glass surface, visibly staining the areas blue. A suitable methylene blue dye solution may include, without limitation, a 1% solution of methylene blue in water.

If this interior surface layer 105 of deposited volatilized species remains on the interior surface 104, solutions contained in the container may leach the deposited volatilized species from the interior surface layer 105. As these volatilized species are leached from the glass, a high silica glass network (gel) remains on the interior surface 104 which swells and strains during hydration and eventually spalls from the surface (i.e., the interior surface 104 of the glass container 100 delaminates), potentially introducing particulate matter into the solution contained within the glass container.

One conventional solution to delamination is to coat the interior surface of the body of the glass container with an inorganic coating, such as $SiO_2$. This coating may have a thickness from about 100 nm to 200 nm and prevents the contents of the container from contacting the interior surface of the body and causing delamination. However, the application of such coatings may be difficult and require additional manufacturing and/or inspection steps, thereby increasing the overall cost of container manufacture. Further, if the contents of the container penetrate the coating and contact the interior surface of the body, such as through a discontinuity in the coating, the resultant delamination of the glass body may cause portions of the coating to detach from the interior surface of the body.

In the embodiments described herein, the propensity of the glass containers to delaminate is mitigated by removing a very thin portion of the interior surface layer 105 from the glass container such that the modified interior surface (i.e., the interior surface of the glass container after removal of the thin interior surface layer) has less volatilized species that can be leached from glass, ultimately causing spalling of the exposed silica network. Additionally, removing a thin layer of the interior surface layer removes excess silica that is present at the surface and not integrated into the glass network. The glass container 100 exhibits an improved resistance to delamination after the thin interior surface layer 105 is removed.

In some embodiments, the interior surface layer 105 is removed from the wall portion 110 of the glass container by etching. For example, an aqueous treating medium may be introduced into the interior volume 108 and allowed to remain in the interior volume for a time sufficient to remove the thin interior surface layer 105. Suitable aqueous treating mediums will uniformly dissolve the thin interior surface layer 105. Specifically, the glass container 100 is generally formed from a glass composition which includes silica ($SiO_2$) as the primary network former and additional constituent components (e.g., $B_2O_3$, alkali oxides, alkaline earth oxides and the like) which are present in the silica network. However, the silica and the constituent components are not necessarily soluble in the same solutions or dissolve at the same rate in a solution. Accordingly, the aqueous treating medium may contain fluoride ions and/or one or more acids to facilitate a uniform dissolution of the glass network and additional constituent components contained in the interior surface layer 105.

In embodiments, the composition of the aqueous treating medium is substantially fluoride-free. The phrase "substantially fluoride-free," as used herein, means that the treating medium comprises less than or equal to about 0.15 wt % (i.e., 1500 ppm) of fluoride ions based on the total weight of the medium. In some embodiments, the aqueous treating medium comprises less than or equal to about 0.12 wt % (i.e., 1200 ppm) of fluoride ions, such as less than or equal to about 0.10 wt % (i.e., 1000 ppm) of fluoride ions. In other embodiments, the aqueous treating medium comprises less than or equal to about 0.095 wt % (i.e., 950 ppm) of fluoride ions, such as less than or equal to about 0.09 wt % (i.e., 900 ppm) of fluoride ions. Further, in some embodiments, the aqueous treating medium can have no fluoride ions. In embodiments containing fluoride ions, a source of the fluoride ions is selected from HF, NaF, $NH_4HF_2$, or the like. In embodiments that contain fluoride, the substantially fluoride-free aqueous acid treating medium can include from about 0.001 to about 0.15 wt % of fluoride ions, such as from about 0.001 to about 0.12 wt % of fluoride ions. In other embodiments, the substantially fluoride-free aqueous acid treating medium can include from about 0.001 to about 0.15 wt % of fluoride ions, such as from about 0.001 to about 0.010 wt % of fluoride ions, or even from about 0.001 to about 0.0090 wt % of fluoride ions.

In embodiments, the substantially fluoride-free aqueous treating medium may be a substantially fluoride-free acidic aqueous treating medium. A variety of acidic compounds can be used, either alone or in combination, to formulate the substantially fluoride-free aqueous acidic treating medium suitable for removing a thin interior surface layer in embodiments disclosed herein. In particular embodiments, the aqueous acidic treating medium comprises a mineral or organic acid including chelating organic acids, such as an aqueous solution of the acid. Exemplary acids used in embodiments include HCl, HBr, $HNO_3$, $H_2SO_4$, $H_2SO_3$, $H_3PO_4$, $H_3PO_2$, HOAc, citric acid, tartaric acid, ascorbic acid, EDTA, methanesulfonic acid, toluenesulfonic acid, mixtures thereof, and combinations comprising at least one of the foregoing.

In embodiments, the substantially fluoride-free aqueous acidic treating medium has a pH of less than or equal to about 3, such as less than or equal to about 2.5. In other embodiments, the substantially fluoride-free aqueous acidic treating medium will have a pH of less than or equal to about 1, such as less than or equal to about 0.5.

In other embodiments, the substantially fluoride-free treating medium is not acidic or may be mildly acidic. For example, in embodiments, the substantially fluoride-free treating medium may have a pH from about 4 to about 12, such as a pH from about 6 to about 12. In some embodiments, the substantially fluoride-free treating medium has a pH from about 6 to about 10, or even from about 8 to about 10.

A variety of compounds can be used, either alone or in combination, to formulate a substantially fluoride-free treating medium suitable for removing a thin interior surface layer in embodiments disclosed herein. In particular embodiments, the substantially fluoride-free treating medium may be an aqueous solution comprising water and fluoride ions. In some embodiments, the substantially fluoride-free treating solution is an aqueous solution comprising basic components such as $NH_3$, or alkali hydroxides (such as, for example, NaOH, KOH, LiOH), or alkaline earth metal hydroxides (such as, for example, $Ca(OH)_2$ or $Ba(OH)_2$).

To remove a thin layer of the interior surface layer, the substantially fluoride-free treating medium is contacted with the interior surface of the glass container. The step of contacting can be implemented by a variety of techniques, including spraying the substantially fluoride-free treating medium onto the glass container, partially or completely immersing the glass container in a vessel that comprises the substantially fluoride-free treating medium, or other like techniques for applying a liquid to a solid surface.

In the embodiments described herein, it should be understood that processing conditions may affect the etch rate of glass in the substantially fluoride-free treating medium and may be adjusted to control the rate of dissolution of the glass. For example, the temperature of the substantially fluoride-free treating medium and/or glass container may be increased to increase the etch rate of the glass in the substantially fluoride-free treating medium, thereby decreasing processing time. Alternatively, the concentration of the substantially fluoride-free treating medium may be increased to increase the etch rate of the glass in the aqueous treating medium, thereby decreasing processing time.

In certain cases, the substantially fluoride-free treating medium may contain compounds known to promote chelation. Chelating agents are added to assist in reducing the activity of metals dissolved in solution. The term "metals" refers to glassy components (Si, Al, B, Na, K, Mg, Ca, Sr, Ba, Fe, Ti, Zr, etc.) which are dissolved by the substantially fluoride-free treating medium. By reducing the activity/concentration of metals in the substantially fluoride-free treating medium, the substantially fluoride-free treating medium more uniformly dissolves the glass surface and promotes the formation of a uniform glass surface chemistry. Said differently, chelating agents may be added to limit incongruent dissolution which creates compositional heterogeneities in depth due to preferential etching.

Similarly, LeChatelier's principal can also be used to precipitate metal species from the substantially fluoride-free treating medium. Different from chelating agents, reactive anions (or functional groups) can be added to the substantially fluoride-free treating medium to force precipitation of metal species from the substantially fluoride-free treating medium and maintain a low metal concentration in the substantially fluoride-free treating medium. When metal concentration is sufficiently low, the substantially fluoride-free treating medium promotes formation of a uniform glass surface chemistry.

Some impurities in the surface composition are related to surface deposits of organic and inorganic particulate matter. Surfactants can be added to the substantially fluoride-free treating medium solution to promote rinsing/removal of these impurities from the glass surface as part of the etching process. With proper choice of surfactants, impurity concentrations can be reduced and aid in formation of a uniform surface chemistry.

While the aqueous treating medium is described hereinabove as being introduced into the interior volume of the glass container, it should be understood that other embodiments are possible. For example, the glass container may be completely submerged in the aqueous treating medium such that the aqueous treating medium is in direct contact with both the interior surface of the glass container and the exterior surface of the glass container. This allows for a layer of glass to be simultaneously removed from the exterior surface of the glass container which can improve the mechanical properties of the glass container. Specifically, flaws, such as scratches, chips or the like, may be introduced into the exterior of the glass container in its as formed condition. Such flaws may be the result of mechanically handling of the containers by processing equipment or the like. These flaws may act as "stress risers" and serve as crack initiation sites, effectively reducing the strength of the glass container. In this embodiment, the exterior surface of the glass container is etched to a point that the etching alters the geometry of the surface flaws. For example, an as-formed surface flaw may have a first geometry, but after etching with the substantially fluoride-free acid treating medium, the surface flaw has a second geometry that, in embodiments, blunts the surface flaw, such as by increasing a width-to-depth ratio of the surface flaw. As stated above, etching the external surface of the glass container allows for the geometry of the flaws to be altered by removing the a layer of glass containing the flaws, thereby reducing the susceptibility of the glass container to failure due to existing flaws. In addition, etching the external surface of the glass container may improve the adherence of coatings subsequently applied to the external surface including, without limitation, organic and inorganic coatings.

In some embodiments, the aqueous treating solution may alter the geometry of the surface flaws without removing any layer of the glass container. Rather, the aqueous treating medium enters the surface flaw and increases a width-to-depth ratio of the surface flaw without removing a layer from the surface.

Without being bound by any particular theory, it is believed that the mechanism underlying the strength improvements achieved through a change in the crack propagation characteristics of the glass vials, due to a blunting of at least some of the strength limiting surface flaws present in the glass through the action of the substantially fluoride-free treating media. On the other hand, it is not desired that contact be so prolonged as to remove significant quantities of surface glass from the treated vials, since such removal can risk reductions in glass surface quality and/or reduce glass container thickness.

For the above reasons, in exemplary embodiments, the contacting step should be carried out for a time at least sufficient to reduce the propagation tendencies of at least the larger strength-limiting surface flaws in the glass, but insufficient to materially reduce the average thickness of the glass containers. As used herein, a "material reduction" in average thickness is considered to be a reduction in excess of 1.0 µm in average thickness. In embodiments, the contacting step results in a reduction in average thickness of the glass containers of from about 100 nm to about 1.0 µm, such as from about 100 nm to about 750 nm. In other embodiments, the contacting step results in a reduction in average thickness of the glass containers from about 200 nm to about 500 nm, or about 300 nm. It should be understood that the contacting described above can be used to reduce the thickness of the interior surface of the glass container and/or the thickness of the exterior surface of the glass container depending on which surface is contacted by the substantially fluoride-free acid treating medium.

Reductions in the propagation tendencies of strength-limiting surface flaws in treated glass vials are indicated in the first instance by significant increases in the rupture strengths or rupture failure points of the treated vials. The term "rupture failure point" refers to the load of force and/or stress at failure (breakage) of a glass container under flexural strength testing.

According to embodiments, once the contacting step is completed, a step of rinsing the strengthened acid-treated glass container to remove any presence of the substantially fluoride-free aqueous acidic medium may be conducted. The rinsing may be done with any suitable solution, such as water—including deionized water, sterilized water, or water for injection (WFI)—or acetone.

While the methods can be used to enhance the strength of glass containers having surface flaws regardless of whether the containers previously have been subjected to a tempering treatment, embodiments wherein the glass container is a tempered glass container, and particularly wherein the tempered container is an ion-exchange-strengthened glass container, are of particular value.

In some embodiments described herein, the glass body 102 is strengthened, such as by ion-exchange strengthening or the like. In embodiments, the glass body 102 may have a compressive stress of greater than or equal to about 250

MPa, 300 MPa or even greater than or equal to about 350 MPa at the surface of the glass. In embodiments, the compressive stress may be greater than or equal to about 400 MPa at the surface of the glass or even greater than or equal to about 450 MPa at the surface of the glass. In some embodiments, the compressive stress may be greater than or equal to about 500 MPa at the surface of the glass or even greater than or equal to about 550 MPa at the surface of the glass. In still other embodiments, the compressive stress may be greater than or equal to about 650 MPa at the surface of the glass or even greater than or equal to about 750 MPa at the surface of the glass. The compressive stress in the glass body 102 generally extends to a depth of layer (DOL) of at least about 10 μm. In some embodiments, the glass body 102 may have a depth of layer greater than about 25 μm or even greater than about 50 μm. In some other embodiments, the depth of the layer may be up to about 75 μm or even about 100 μm. The ion-exchange strengthening may be performed in a molten salt bath maintained at temperatures from about 350° C. to about 600° C. To achieve the desired compressive stress, the glass container in as-formed condition may be immersed in the salt bath for less than about 30 hours or even less than about 20 hours. In embodiments, the container may be immersed for less than about 15 hours or even for less than about 12 hours. In other embodiments, the container may be immersed for less than about 10 hours. For example, in one embodiment the glass container is immersed in a 100% $KNO_3$ salt bath at about 450° C. for about 5 hours to about 8 hours in order to achieve the desired depth of layer and compressive stress while maintaining the chemical durability of the glass composition.

The minimization of surface glass removal in these embodiments avoids undesirable reductions in surface compression layer thicknesses and stress levels in tempered glasses. For the treatment of such glasses, therefore, the step of contacting is carried out only for a time that prevents a material reduction in the level of surface compression in the glass container. As used herein, the term "material reduction in surface compression" means that a reduction of less than or equal to about 4% in the level of surface compression is observed after the contacting step. In embodiments, the level of surface compression is reduced by an amount of from about 0.1% to about 4%, such as from about 0.1% to about 3.5%, or even from about 0.1% to about 3%. In other embodiments, the level of surface compression is reduced by an amount of from about 0.1% to about 2.5%, such as from about 0.1% to about 2%, or even from about 0.1% to about 1.5%. In yet other embodiments, the level of surface compression is reduced by an amount of from about 0.1% to about 1%, such as from about 0.1% to about 0.5%, or even from about 0.1% to about 0.25%.

The ion exchange treatment disclosed above may be conducted before or after removing a thin layer of the glass container. In some embodiments, a thin layer of the interior surface of the glass container may be removed by contacting a substantially fluoride-free acid treatment medium as described herein to the interior of the container and, subsequently, conducting an ion exchange on at least the exterior of the glass container followed by removing a thin layer of the exterior of the container to change the geometry of surface flaws on the exterior of the glass container as disclosed above.

As stated above, the strengthened acid-treated glass containers have substantially the same thickness as the untreated glass containers, and exhibit an increased rupture failure point than the untreated glass containers. At least a subset of the strength limiting surface flaws in the untreated glass containers exhibit reduced propagation tendencies after the acid treatment owing to a change in their geometries. In general, those strength limiting surface flaws that undergo a change in geometry and have blunted crack tips after the acid treatment, as can be evidenced by surface characterization techniques such as optical microscopy. The term "blunted" refers to the angle of the crack tip increasing by a factor of 2 or greater. In some embodiments, the angle of the crack tip increases by a factor of 5 or greater, such as by a factor of 10 or greater. In some embodiments, the angle of the crack tip increases to greater than 20 degrees. In other embodiments, the angle of the crack tip increases to greater than 40 degrees, such as greater than 60 degrees. In yet other embodiments, the angle of the crack tip increases to greater than 80 degrees, such as greater than 100 degrees.

In addition, in some embodiments, the strengthened acid-treated glass containers produced herein can have higher rupture failure points than if the glass container were treated with a high fluoride-ion-containing medium for strengthening. For example, in some embodiments, the high fluoride-ion-containing medium can result in a high degree of glass surface roughening or glass surface frosting as a result of uneven etching, which may be a consequence of stress in the glass, inhomogeneity in the glass, and/or surface contamination (such as dust or fingerprints). This glass surface roughening or frosting may lower the glass surface strength compared to a glass article with less surface roughening or frosting that can be produced using low-fluoride ion medium disclosed and described herein.

Removing a thin layer of the interior surface layer with the persistent layer heterogeneity or with persistent layer homogeneity, generally improves the resistance of the glass container to delamination. Specifically, removing volatilized species from the surface of the interior surface layer reduces the amount of these volatilized species that may be disassociated from the interior surface layer when the glass container is in use.

As noted above, delamination may result in the release of silica-rich glass flakes into a solution contained within the glass container after extended exposure to the solution. Accordingly, the resistance to delamination may be characterized by the number of glass particulates present in a solution contained within the glass container after exposure to the solution under specific conditions. In order to assess the long-term resistance of the glass container to delamination, an accelerated delamination test was utilized. The test was performed on both ion-exchanged and non-ion-exchanged glass containers. The test consisted of washing the glass container at room temperature for 1 minute and depyrogenating the container at about 320° C. for 1 hour. Thereafter a solution of 20 mM glycine with a pH of 10 in water is placed in the glass container to 80-90% fill, the glass container is closed, and rapidly heated to 100° C., and then heated from 100° C. to 121° C. at a ramp rate of 1 deg/min at a pressure of 2 atmospheres. The glass container and solution are held at this temperature for 60 minutes, cooled to room temperature at a rate of 0.5 deg/min and the heating cycle and hold are repeated. The glass container is then heated to 50° C. and held for ten or more days for elevated temperature conditioning. After heating, the glass container is dropped from a distance of at least 18" onto a firm surface, such as a laminated tile floor, to dislodge any flakes or particles that are weakly adhered to the inner surface of the glass container. The distance of the drop may be scaled appropriately to prevent larger sized vials from fracturing on impact.

Thereafter, the solution contained in the glass container is analyzed to determine the number of glass particles present per liter of solution. Specifically, the solution from the glass container is directly poured onto the center of a Millipore Isopore Membrane filter (Millipore #ATTP02500 held in an assembly with parts #AP1002500 and #M000025A0) attached to vacuum suction to draw the solution through the filter within 10-15 seconds for 5 mL. Thereafter, another 5 mL of water was used as rinse to remove buffer residue from the filter media. Particulate flakes are then counted by differential interference contrast microscopy (DIC) in the reflection mode as described in "Differential interference contrast (DIC) microscopy and modulation contrast microscopy" from Fundamentals of light microscopy and digital imaging. New York: Wiley-Liss, pp 153-168. The field of view is set to approximately 1.5 mm×1.5 mm and particles larger than 50 µm are counted manually. There are 9 such measurements made in the center of each filter membrane in a 3×3 pattern with no overlap between images. If larger areas of the filter media are analyzed, results can be normalized to equivalent area (i.e., 20.25 mm$^2$). The images collected from the optical microscope are examined with an image analysis program (Media Cybernetic's ImagePro Plus version 6.1) to measure and count the number of glass flakes present. This was accomplished as follows: all of the features within the image that appeared darker than the background by simple grayscale segmentation were highlighted; the length, width, area, and perimeter of all of the highlighted features that have a length greater than 25 micrometers are then measured; any obviously non-glass particles are then removed from the data; the measurement data is then exported into a spreadsheet. Then, all of the features greater than 25 micrometers in length and brighter than the background are extracted and measured; the length, width, area, perimeter, and X-Y aspect ratio of all of the highlighted features that have a length greater than 25 micrometers are measured; any obviously non-glass particles are removed from the data; and the measurement data is appended to the previously exported data in the spreadsheet. The data within the spreadsheet is then sorted by feature length and broken into bins according to size. The reported results are for features greater than 50 micrometers in length. Each of these groups were then counted and the counts reported for each of the samples.

A minimum of 100 mL of solution is tested. As such, the solution from a plurality of small containers may be pooled to bring the total amount of solution to 100 mL. For containers having a volume greater than 10 mL, the test is repeated for a trial of 10 containers formed from the same glass composition under the same processing conditions and the result of the particle count is averaged for the 10 containers to determine an average particle count. Alternatively, in the case of small containers, the test is repeated for a trial of 10 vials, each of which is analyzed and the particle count averaged over the multiple trials to determine an average particle count per trial. Averaging the particle count over multiple containers accounts for potential variations in the delamination behavior of individual containers. Table 1 summarizes some non-limiting examples of sample volumes and numbers of containers for testing:

TABLE 1

Exemplary Test Specimens

| Nominal Vial Capacity (mL) | Vial Max Volume (mL) | Minimum Solution per Vial (mL) | Number of Vials in a Trial | Number of Trials | Total Solution Tested (mL) |
|---|---|---|---|---|---|
| 2.0 | 4.0 | 3.2 | 10 | 4 | 128 |
| 3.5 | 7.0 | 5.6 | 10 | 2 | 112 |
| 4.0 | 6.0 | 4.8 | 10 | 3 | 144 |
| 5.0 | 10.0 | 8.0 | 10 | 2 | 160 |
| 6.0 | 10.0 | 8.0 | 10 | 2 | 160 |
| 8.0 | 11.5 | 9.2 | 10 | 2 | 184 |
| 10.0 | 13.5 | 10.8 | 10 | 1 | 108 |
| 20.0 | 26.0 | 20.8 | 10 | 1 | 208 |
| 30.0 | 37.5 | 30.0 | 10 | 1 | 300 |
| 50.0 | 63.0 | 50.4 | 10 | 1 | 504 |

It should be understood that the aforementioned test is used to identify particles which are shed from the interior wall(s) of the glass container due to delamination and not tramp particles present in the container from forming processes or particles which precipitate from the solution enclosed in the glass container as a result of reactions between the solution and the glass. Specifically, delamination particles may be differentiated from tramp glass particles based on the aspect ratio of the particle (i.e., the ratio of the maximum length of the particle to the thickness of the particle, or a ratio of the maximum and minimum dimensions). Delamination produces particulate flakes or lamellae which are irregularly shaped and typically have a maximum length greater than about 50 µm but often greater than about 200 µm. The thickness of the flakes is usually greater than about 100 nm and may be as large as about 1 µm. Thus, the minimum aspect ratio of the flakes is typically greater than about 50. The aspect ratio may be greater than about 100 and sometimes greater than about 1000. In contrast, tramp glass particles will generally have a low aspect ratio which is less than about 3. Accordingly, particles resulting from delamination may be differentiated from tramp particles based on aspect ratio during observation with the microscope. Other common non-glass particles include hairs, fibers, metal particles, plastic particles, and other contaminants and are thus excluded during inspection. Validation of the results can be accomplished by evaluating interior regions of the tested containers. Upon observation, evidence of skin corrosion/pitting/flake removal, as described in "Nondestructive Detection of Glass Vial Inner Surface Morphology with Differential Interference Contrast Microscopy" from Journal of Pharmaceutical Sciences 101(4), 2012, pages 1378-1384, is noted.

In the embodiments described herein, the number of particles present following accelerated delamination testing may be utilized to establish a delamination factor for the set of vials tested. In the embodiments described herein, trials of glass containers which average less than 10 glass particles with a minimum length of about 50 µm and an aspect ratio of greater than about 50 per trial following accelerated delamination testing are considered to have a delamination factor of 10. In the embodiments described herein, trials of glass containers which average less than 9 glass particles with a minimum length of about 50 µm and an aspect ratio of greater than about 50 per trial following accelerated delamination testing are considered to have a delamination factor of 9. In the embodiments described herein, trials of glass containers which average less than 8 glass particles with a minimum length of about 50 µm and an aspect ratio of greater than about 50 per trial following accelerated delamination testing are considered to have a delamination factor of 8. In the embodiments described herein, trials of glass containers which average less than 7 glass particles with a minimum length of about 50 μm and an aspect ratio of greater than about 50 per trial following accelerated delamination testing are considered to have a delamination factor of 7. In the embodiments described herein, trials of glass containers which average less than 6 glass particles with a minimum length of about 50 μm and an aspect ratio of greater than about 50 per trial following accelerated delamination testing are considered to have a delamination factor of 6. In the embodiments described herein, trials of glass containers which average less than 5 glass particles with a minimum length of about 50 μm and an aspect ratio of greater than about 50 per trial following accelerated delamination testing are considered to have a delamination factor of 5. In the embodiments described herein, trials of glass containers which average less than 4 glass particles with a minimum length of about 50 μm and an aspect ratio of greater than about 50 per trial following accelerated delamination testing are considered to have a delamination factor of 4. In the embodiments described herein, trials of glass containers which average less than 3 glass particles with a minimum length of about 50 μm and an aspect ratio of greater than about 50 per trial following accelerated delamination testing are considered to have a delamination factor of 3. In the embodiments described herein, trials of glass containers which average less than 2 glass particles with a minimum length of about 50 μm and an aspect ratio of greater than about 50 per trial following accelerated delamination testing are considered to have a delamination factor of 2. In the embodiments described herein, trials of glass containers which average less than 1 glass particle with a minimum length of about 50 μm and an aspect ratio of greater than about 50 per trial following accelerated delamination testing are considered to have a delamination factor of 1. In the embodiments described herein, trials of glass containers which have 0 glass particles with a minimum length of about 50 μm and an aspect ratio of greater than about 50 per trial following accelerated delamination testing are considered to have a delamination factor of 0. Accordingly, it should be understood that the lower the delamination factor, the better the resistance of the glass container to delamination. In the embodiments described herein, the glass containers have a delamination factor of 10 or lower (i.e., a delamination factor of 3, 2, 1 or 0) after the thin layer of the interior surface layer with the persistent layer heterogeneity has been removed from the glass container.

Glass containers having the characteristics described hereinabove are obtained by removing a thin layer of the interior surface layer with the persistent layer heterogeneity from the glass container, as described herein. Specifically, in embodiments, the containers are initially formed from a Type IB glass composition such that the glass containers have an interior surface layer with a persistent layer heterogeneity extending in the interior surface of the glass container (i.e., the composition of the interior surface layer is different than the composition of the glass at the midpoint of the wall portion). The containers are initially formed by providing a glass stock material, such as glass tubing, glass sheet or the like, and shaping the glass stock material into a glass container using conventional shaping techniques such that at least the interior surface of the glass container has an interior surface layer with a persistent heterogeneity. Thereafter, a thin layer of the interior surface layer with the persistent layer heterogeneity is removed from the interior surface of the glass container, as described herein.

In the embodiments described herein, the glass containers may be formed from glass compositions which meet the criteria for Type I, Class A (Type IA) or Type I, Class B (Type IB) glasses under ASTM Standard E438-92 (2011) entitled "Standard Specification for Glasses in Laboratory Apparatus". Borosilicate glasses meet the Type I (A or B) criteria and are routinely used for pharmaceutical packaging. Examples of borosilicate glass include, without limitation, Corning® Pyrex® 7740, 7800, Wheaton 180, 200, and 400, Schott Duran®, Schott Fiolax®, KIMAX® N-51A, Gerresheimer GX-51 Flint and others.

The glass compositions from which the glass containers are formed are chemically durable and resistant to degradation, as determined by the ISO 720 standard, after a thin layer of the interior surface layer with the persistent layer heterogeneity has been removed from the glass container. The ISO 720 standard is a measure of the resistance of the glass to degradation in distilled water (i.e., the hydrolytic resistance of the glass). In brief, the ISO 720 standard protocol utilizes crushed grass grains which are placed in contact with 18 MΩ water under autoclave conditions (121° C., 2 atm) for 30 minutes. The solution is then titrated colorimetrically with dilute HCl to neutral pH. The amount of HCl required to titrate to a neutral solution is then converted to an equivalent of $Na_2O$ extracted from the glass and reported in μg of glass with smaller values indicative of greater durability. The ISO 720 entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." Each standard and the classifications standard is broken into individual types. Type HGA1 is indicative of up to 62 μg extracted equivalent of $Na_2O$; Type HGA2 is indicative of more than 62 μg and up to 527 μg extracted equivalent of $Na_2O$; and Type HGA3 is indicative of more than 527 μg and up to 930 μg extracted equivalent of $Na_2O$. The glass containers described herein have an ISO 720 type HGA1 hydrolytic resistance after a thin layer of the interior surface layer with the persistent layer heterogeneity has been removed from the glass container.

The glass compositions from which the glass containers are formed are also chemically durable and resistant to degradation, as determined by the ISO 719 standard, after the thin layer of the interior surface layer with the persistent layer heterogeneity has been removed from the glass container. The ISO 719 standard is a measure of the resistance of the glass to degradation in distilled water (i.e., the hydrolytic resistance of the glass). In brief, the ISO 719 standard protocol utilizes crushed glass grains which are placed in contact with 18 MΩ water at a pressure of 2 atm and a temperature of 98° C. for 60 minutes. The solution is then titrated colorimetrically with dilute HCl to neutral pH. The amount of HCl required to titrate to a neutral solution is then converted to an equivalent of $Na_2O$ extracted from the glass and reported in μg of glass with smaller values indicative of greater durability. The ISO 719 standard is broken into individual types. Type HGB1 is indicative of up to 31 μg extracted equivalent of $Na_2O$; Type HGB2 is indicative of more than 31 μg and up to 62 μg extracted equivalent of $Na_2O$; Type HGB3 is indicative of more than 62 μg and up to 264 μg extracted equivalent of $Na_2O$; Type HGB4 is indicative of more than 264 μg and up to 620 μg extracted equivalent of $Na_2O$; and Type HGB5 is indicative of more than 620 μg and up to 1085 μg extracted equivalent of $Na_2O$. The glass containers described herein have an ISO 719 type HGB1 hydrolytic resistance after the thin layer of the interior surface layer with the persistent layer heterogeneity has been removed from the glass container.

With respect to the USP <660> test and/or the European Pharmacopeia 3.2.1 test, the glass containers described herein have a Type 1 chemical durability after the thin layer of the interior surface layer with the persistent layer heterogeneity has been removed from the glass container. As noted above, the USP <660> and European Pharmacopeia 3.2.1 tests are performed on intact glass containers rather than crushed grains of glass and, as such, the USP <660> and European Pharmacopeia 3.2.1 tests may be used to directly assess the chemical durability of the interior surface of the glass containers.

The glass compositions from which the glass containers are formed are also chemically durable and resistant to degradation in acidic solutions, as determined by the DIN 12116 standard, after the thin layer of the interior surface layer with the persistent layer heterogeneity has been removed from the glass container. In brief, the DIN 12116 standard utilizes a polished glass sample of a known surface area which is weighed and then positioned in contact with a proportional amount of boiling 6 M hydrochloric acid for 6 hours. The sample is then removed from the solution, dried and weighed again. The glass mass lost during exposure to the acidic solution is a measure of the acid durability of the sample with smaller numbers indicative of greater durability. The results of the test are reported in units of half-mass per surface area, specifically $mg/dm^2$. The DIN 12116 standard is broken into individual classes. Class S1 indicates weight losses of up to 0.7 $mg/dm^2$; Class S2 indicates weight losses from 0.7 $mg/dm^2$ up to 1.5 $mg/dm^2$; Class S3 indicates weight losses from 1.5 $mg/dm^2$ up to 15 $mg/dm^2$; and Class S4 indicates weight losses of more than 15 $mg/dm^2$. The glass containers described herein have a DIN 12116 Class S2 acid resistance or better after the thin layer of the interior surface layer with the persistent layer heterogeneity has been removed from the glass container.

The glass compositions from which the glass containers are formed are also chemically durable and resistant to degradation in basic solutions, as determined by the ISO 695 standard, after the thin layer of the interior surface layer with the persistent layer heterogeneity has been removed from the glass container. In brief, the ISO 695 standard utilizes a polished glass sample which is weighed and then placed in a solution of boiling 1 M NaOH+0.5M $Na_2CO_3$ for 3 hours. The sample is then removed from the solution, dried and weighed again. The glass mass lost during exposure to the basic solution is a measure of the base durability of the sample with smaller numbers indicative of greater durability. As with the DIN 12116 standard, the results of the ISO 695 standard are reported in units of mass per surface area, specifically $mg/dm^2$. The ISO 695 standard is broken into individual classes. Class A1 indicates weight losses of up to 75 $mg/dm^2$; Class A2 indicates weight losses from 75 $mg/dm^2$ up to 175 $mg/dm^2$; and Class A3 indicates weight losses of more than 175 $mg/dm^2$. The glass containers described herein have an ISO 695 base resistance of Class A2 or better after the thin layer of the interior surface layer with the persistent layer heterogeneity has been removed from the glass container.

It should be understood that, when referring to the above referenced classifications according to ISO 695, ISO 719, ISO 720 or DIN 12116, a glass composition or glass container which has a specified classification "or better" means that the performance of the glass composition is as good as or better than the specified classification. For example, a glass container which has an ISO 695 base resistance of "Class A2" or better may have an ISO 695 classification of either Class A2 or Class A1.

Glass containers may be subject to damage, such as impact damage, scratches and/or abrasions, as the containers are processed and filled. Such damage is often caused by contact between individual glass containers or contact between the glass containers and manufacturing equipment. This damage generally decreases the mechanical strength of the container and may lead to through-cracks which can compromise the integrity of the contents of the container. Accordingly, in some embodiments described herein, the glass containers further include a low-friction coating positioned around at least a portion of the outer surface of the body. In some embodiments, the low-friction coating may be positioned on at least the outer surface of the body of the glass container while, in other embodiments, one or more intermediate coatings may be positioned between the low-friction coating and the outer surface of the body, such as when an inorganic coating is utilized to compressively stress the surface of the body. The low-friction coating decreases the coefficient of friction of the portion of the body with the coating and, as such, decreases the occurrence of abrasions and surface damage on the outer surface of the glass body. In essence, the coating allows the container to "slip" relative to another object (or container) thereby reducing the possibility of surface damage on the glass. Moreover, the low-friction coating also cushions the body of the glass container, thereby lessening the effect of blunt impact damage to the glass container. Exemplary coatings are disclosed in U.S. patent application Ser. No. 14/075,630 filed on Nov. 8, 2013, which is incorporated herein by reference in its entirety.

A lower or reduced coefficient of friction may impart improved strength and durability to the glass article by mitigating frictive damage to the glass. Further, the low-friction coating may maintain the aforementioned improved strength and durability characteristics following exposure to elevated temperatures and other conditions, such as those experienced during packaging and pre-packaging steps utilized in packaging pharmaceuticals, such as, for example, depyrogentation, autoclaving and the like. Accordingly, the low-friction coatings and glass articles with the low-friction coating are thermally stable.

The low-friction coating may generally comprise a coupling agent, such as a silane, and a polymer chemical composition, such as a polyimide. In some embodiments, the coupling agent may be disposed in a coupling agent layer positioned on the surface of the glass article and the polymer chemical composition may be disposed in a polymer layer positioned on the coupling agent layer. In other embodiments, the coupling agent and the polymer chemical composition may be mixed in a single layer. Suitable coatings are described in U.S. patent application Ser. No. 13/780,740 filed on Feb. 28, 2013.

Referring to the embodiments described above, the silane chemical composition, may be aromatic chemical compositions. As used herein, an aromatic chemical composition contains one or more six-carbon rings characteristic of the benzene series and related organic moieties. The aromatic silane chemical composition may be an alkoxysilane such as, but not limited to, a dialkoxysilane chemical composition, hydrolysate thereof, or oligomer thereof, or a trialkoxysilane chemical composition, hydrolysate thereof, or oligomer thereof. In some embodiments, the aromatic silane may comprise an amine moiety, and may be an alkoxysilane comprising an amine moiety. In another embodiment, the aromatic silane chemical composition may be an aromatic alkoxysilane chemical composition, an aromatic acyloxysilane chemical composition, an aromatic halogen silane chemical composition, or an aromatic aminosilane chemical composition. In another embodiment, the aromatic silane chemical composition may be selected from the group consisting of aminophenyl, 3-(m-aminophenoxy) propyl, N-phenylaminopropyl, or (chloromethy)phenyl substituted alkoxy, acyloxy, hylogen, or amino silanes. For example, the aromatic alkoxysilane may be, but is not limited to, aminophenyltrimethoxy silane (sometimes referred to herein as "APhTMS"), aminophenyldimethoxy silane, aminophenyltriethoxy silane, aminophenyldiethoxy silane, 3-(m-aminophenoxy)propyltrimethoxy silane, 3-(m-aminophenoxy)propyldimethoxy silane, 3-(m-aminophenoxy)propyltriethoxy silane, 3-(m-aminophenoxy) propyldiethoxy silane, N-phenylaminopropyltrimethoxysilane, N-phenylaminopropyldimethoxysilane, N-phenylaminopropyltriethoxysilane, N-phenylaminopropyldiethoxysilane, hydrolysates thereof, or oligomerized chemical composition thereof. In an exemplary embodiment, the aromatic silane chemical composition may be aminophenyltrimethoxy silane.

Referring again to the embodiments described above, the silane chemical composition may be aliphatic chemical compositions. As used herein, an aliphatic chemical composition is non-aromatic, such as a chemical composition having an open chain structure, such as, but not limited to, alkanes, alkenes, and alkynes. For example, in some embodiments, the coupling agent may comprise a chemical composition that is an alkoxysilane and may be an aliphatic alkoxysilane such as, but not limited to, a dialkoxysilane chemical composition, a hydrolysate thereof, or an oligomer thereof, or a trialkoxysilane chemical composition, a hydrolysate thereof, or an oligomer thereof. In some embodiments, the aliphatic silane may comprise an amine moiety, and may be an alkoxysilane comprising an amine moiety, such as an aminoalkyltrialkoxysilane. In one embodiment, an aliphatic silane chemical composition may be selected from the group consisting of 3-aminopropyl, N-(2-aminoethyl)-3-aminopropyl, vinyl, methyl, N-phenylaminopropyl, (N-phenylamino)methyl, N-(2-Vinylbenzylaminoethyl)-3-aminopropyl substituted alkoxy, acyloxy, hylogen, or amino silanes, hydrolysates thereof, or oligomers thereof. Aminoalkyltrialkoxysilanes, include, but are not limited to, 3-aminopropyltrimethoxy silane (sometimes referred to herein as "GAPS"), 3-aminopropyldimethoxy silane, 3-aminopropyltriethoxy silane, 3-aminopropyldiethoxy silane, N-(2-aminoethyl)-3-aminopropyltrimethoxysilane, N-(2-aminoethyl)-3-aminopropyldimethoxysilane, N-(2-aminoethyl)-3-aminopropyltriethoxysilane, N-(2-aminoethyl)-3-aminopropyldiethoxysilane, hydrolysates thereof, and oligomerized chemical composition thereof. In other embodiments, the aliphatic alkoxysilane chemical composition may not contain an amine moiety, such as an alkyltrialkoxysilane or alkylbialkoxysilane. Such alkyltrialkoxysilanes or alkylbialkoxysilanes include, but are not limited to, vinyltrimethoxy silane, vinyldimethoxy silane, vinyltriethoxy silane, vinyldiethoxy silane, methyltrimethoxysilane, methyldimethoxysilane, methyltriethoxysilane, methyldiethoxysilane, hydrolysates thereof, or oligomerized chemical composition thereof. In an exemplary embodiment, the aliphatic silane chemical composition is 3-aminopropyltrimethoxy silane.

As noted herein, the low-friction coating also includes a polymer chemical composition. The polymer chemical composition may be a thermally stable polymer or mixture of polymers, such as but not limited to, polyimides, polybenzimidazoles, polysulfones, polyetheretheketones, polyetherimides, polyamides, polyphenyls, polybenzothiazoles, polybenzoxazoles, polybisthiazoles, and polyaromatic heterocyclic polymers with and without organic or inorganic fillers. The polymer chemical composition may be formed from other thermally stable polymers, such as polymers that do not degrade at temperatures in the range of from 200° C. to 400° C., including 250° C., 300° C., and 350° C. These polymers may be applied with or without a coupling agent.

In one embodiment, the polymer chemical composition is a polyimide chemical composition. If the low-friction coating comprises a polyimide, the polyimide composition may be derived from a polyamic acid, which is formed in a solution by the polymerization of monomers. One such polyamic acid is Novastrat® 800 (commercially available from NeXolve). A curing step imidizes the polyamic acid to form the polyimide. The polyamic acid may be formed from the reaction of a diamine monomer, such as a diamine, and an anhydride monomer, such as a dianhydride. As used herein, polyimide monomers are described as diamine monomers and dianhydride monomers. However, it should be understood that while a diamine monomer comprises two amine moieties, in the description that follows, any monomer comprising at least two amine moieties may be suitable as a diamine monomer. Similarly, it should be understood that while a dianhydride monomer comprises two anhydride moieties, in the description that follows any monomer comprising at least two anhydride moieties may be suitable as a dianhydride monomer. The reaction between the anhydride moieties of the anhydride monomer and amine moieties of the diamine monomer forms the polyamic acid. Therefore, as used herein, a polyimide chemical composition that is formed from the polymerization of specified monomers refers to the polyimide that is formed following the imidization of a polyamic acid that is formed from those specified monomers. Generally, the molar ratio of the total anhydride monomers and diamine monomers may be about 1:1. While the polyimide may be formed from only two distinct chemical compositions (one anhydride monomer and one diamine monomer), at least one anhydride monomer may be polymerized and at least one diamine monomer may be polymerized to from the polyimide. For example, one anhydride monomer may be polymerized with two different diamine monomers. Any number of monomer specie combinations may be used. Furthermore, the ratio of one anhydride monomer to a different anhydride monomer, or one or more diamine monomer to a different diamine monomer may be any ratio, such as between about 1:0.1 to 0.1:1, such as about 1:9, 1:4, 3:7, 2:3, 1:1, 3:2, 7:3, 4:1 or 1:9.

The anhydride monomer from which, along with the diamine monomer, the polyimide is formed may comprise any anhydride monomer. In one embodiment, the anhydride monomer comprises a benzophenone structure. In an exemplary embodiment, benzophenone-3,3',4,4'-tetracarboxylic dianhydride may be at least one of the anhydride monomer from which the polyimide is formed. In other embodiments, the diamine monomer may have an anthracene structure, a phenanthrene structure, a pyrene structure, or a pentacene structure, including substituted versions of the above mentioned dianhydrides.

The diamine monomer from which, along with the anhydride monomer, the polyimide is formed may comprise any diamine monomer. In one embodiment, the diamine monomer comprises at least one aromatic ring moiety. The diamine monomer may have one or more carbon molecules connecting two aromatic ring moieties together. Alternatively, the diamine monomer may have two aromatic ring moieties that are directly connected and not separated by at least one carbon molecule.

Two different chemical compositions of diamine monomers may form the polyimide. In one embodiment, a first diamine monomer comprises two aromatic ring moieties that are directly connected and not separated by a linking carbon molecule, and a second diamine monomer comprises two aromatic ring moieties that are connected with at least one carbon molecule connecting the two aromatic ring moieties. In one exemplary embodiment, the first diamine monomer, the second diamine monomer, and the anhydride monomer have a molar ratio (first diamine monomer:second diamine monomer:anhydride monomer) of about 0.465:0.035:0.5. However, the ratio of the first diamine monomer and the second diamine monomer may vary in a range of about 0.01:0.49 to about 0.40:0.10, while the anhydride monomer ratio remains at about 0.5.

In one embodiment, the polyimide composition is formed from the polymerization of at least a first diamine monomer, a second diamine monomer, and an anhydride monomer, wherein the first and second diamine monomers are different chemical compositions. In one embodiment, the anhydride monomer is a benzophenone, the first diamine monomer comprises two aromatic rings directly bonded together, and the second diamine monomer comprises two aromatic rings bonded together with at least one carbon molecule connecting the first and second aromatic rings. The first diamine monomer, the second diamine monomer, and the anhydride monomer may have a molar ratio (first diamine monomer:second diamine monomer:anhydride monomer) of about 0.465:0.035:0.5.

In an exemplary embodiment, the first diamine monomer is ortho-Tolidine, the second diamine monomer is 4,4'-methylene-bis(2-methylaniline), and the anhydride monomer is benzophenone-3,3',4,4'-tetracarboxylic dianhydride. The first diamine monomer, the second diamine monomer, and the anhydride monomer may have a molar ratio (first diamine monomer:second diamine monomer:anhydride monomer) of about 0.465:0.035:0.5.

In some embodiments, the polyimide may be formed from the polymerization of one or more of: bicyclo[2.2.1]heptane-2,3,5,6-tetracarboxylic dianhydride, cyclopentane-1,2,3,4-tetracarboxylic 1,2;3,4-dianhydride, bicyclo[2.2.2]octane-2,3,5,6-tetracarboxylic dianhydride, 4arH,8acH)-decahydro-1t,4t:5c,8c-dimethanonaphthalene-2t,3t,6c,7c-tetracarboxylic 2,3:6,7-dianhydride, 2c,3c,6c,7c-tetracarboxylic 2,3:6,7-dianhydride, 5-endo-carboxymethylbicyclo[2.2.1]-heptane-2-exo,3-exo,5-exo-tricarboxylic acid 2,3:5,5-dianhydride, 5-(2,5-Dioxotetrahydro-3-furanyl)-3-methyl-3-cyclohexene-1,2-dicarboxylic anhydride, isomers of Bis(aminomethyl) bicyclo[2.2.1]heptane, or 4,4'-Methylenebis(2-methylcyclohexylamine), Pyromellitic dianhydride (PMDA) 3,3',4,4'-Biphenyl dianhydride (4,4'-BPDA), 3,3', 4,4'-Benzophenone dianhydride (4,4'-BTDA), 3,3',4,4'-Oxydiphthalic anhydride (4,4'-ODPA), 1,4-Bis(3,4-dicarboxylphenoxy)benzene dianhydride (4,4'-HQDPA), 1,3-Bis(2,3-dicarboxyl-phenoxy)benzene dianhydride (3,3'-HQDPA), 4,4'-Bis(3,4-dicarboxyl phenoxyphenyl)-isopropylidene dianhydride (4,4'-BPADA), 4,4'-(2,2,2-Trifluoro-1-pentafluorophenylethylidene)diphthalic dianhydride (3FDA), 4,4'-Oxydianiline (ODA), m-Phenylenediamine (MPD), p-Phenylenediamine (PPD), m-Toluenediamine (TDA), 1,4-Bis(4-aminophenoxy)benzene (1,4,4-APB), 3,3'-(m-Phenylenebis(oxy))dianiline (APB), 4,4'-Diamino-3,3'-dimethyldiphenylmethane (DMMDA), 2,2'-Bis(4-(4-aminophenoxy)phenyl)propane (BAPP), 1,4-Cyclohexanediamine 2,2'-Bis[4-(4-amino-phenoxy)phenyl] hexafluoroisoproylidene (4-BDAF), 6-Amino-1-(4'-aminophenyl)-1,3,3-trimethylindane (DAPI), Maleic anhydride (MA), Citraconic anhydride (CA), Nadic anhydride (NA), 4-(Phenylethynyl)-1,2-benzenedicarboxylic acid anhydride (PEPA), 4,4'-diaminobenzanilide (DABA), 4,4'-(hexafluoroisopropylidene)di-phthalicanhydride (6-FDA), Pyromellitic dianhydride, benzophenone-3,3',4,4'-tetracarboxylic dianhydride, 3,3',4,4'-biphenyltetracarboxylic dianhydride, 4,4'-(hexafluoroisopropylidene)diphthalic anhydride, perylene-3,4,9,10-tetracarboxylic dianhydride, 4,4'-oxydiphthalic anhydride, 4,4'-(hexafluoroisopropylidene)diphthalic anhydride, 4,4'-(4,4'-Isopropylidenediphenoxy)bis(phthalic anhydride), 1,4,5,8-Naphthalenetetracarboxylic dianhydride, 2,3,6,7-Naphthalenetetracarboxylic dianhydride, as well as those materials described in U.S. Pat. No. 7,619,042, U.S. Pat. No. 8,053,492, U.S. Pat. No. 4,880,895, U.S. Pat. No. 6,232,428, U.S. Pat. No. 4,595,548, WO Pub. No. 2007/016516, U.S. Pat. Pub. No. 2008/0214777, U.S. Pat. No. 6,444,783, U.S. Pat. No. 6,277,950, and U.S. Pat. No. 4,680,373, which are incorporated herein by reference in their entirety. In another embodiment, the polyamic acid solution from which the polyimide is formed may comprise poly(pyromellitic dianhydride-co-4,4'-oxydianiline) amic acid (commercially available from Aldrich).

As referenced above, the coating may have a low coefficient of friction. The coefficient of friction ($\mu$) of the portion of the coated glass container with the low-friction coating may have a lower coefficient of friction than a surface of an uncoated glass container formed from a same glass composition. A coefficient of friction ($\mu$) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for a coated glass container is reported as the coefficient of friction between the outer surface of a first glass container and the outer surface of second glass container which is identical to the first glass container, wherein the first and second glass containers have the same body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig. However, it should be understood that a coated glass container which exhibits a maximum coefficient of friction at a specific applied load will also exhibit the same or better (i.e., lower) maximum coefficient of friction at a lesser load. For example, if a coated glass container exhibits a maximum coefficient of friction of 0.5 or lower under an applied load of 50 N, the coated glass container will also exhibit a maximum coefficient of friction of 0.5 or lower under an applied load of 25 N.

In the embodiments described herein, the coefficient of friction of the glass containers (both coated and uncoated) is measured with a vial-on-vial testing jig. This measurement technique and corresponding device are described in U.S. patent application Ser. No. 13/780,740 filed on Feb. 28, 2013, which is incorporated herein by reference in its entirety.

In the embodiments described herein, the portion of the coated glass container with the low-friction coating has a coefficient of friction of less than or equal to about 0.7 relative to a like-coated glass container, as determined with the vial-on-vial testing jig. In other embodiments, the coefficient of friction may be less than or equal to about 0.6, or even less than or equal to about 0.5. In some embodiments, the portion of the coated glass container with the low-friction coating has a coefficient of friction of less than or equal to about 0.4, or even less than or equal to about 0.3. Coated glass containers with coefficients of friction less than or equal to about 0.7 generally exhibit improved resistance to frictive damage and, as a result, have improved mechanical properties. For example, conventional glass containers (without a low-friction coating) may have a coefficient of friction of greater than 0.7.

In some embodiments described herein, the coefficient of friction of the portion of the coated glass container with the low-friction coating is at least 20% less than a coefficient of friction of a surface of an uncoated glass container formed from a same glass composition. For example, the coefficient of friction of the portion of the coated glass container with the low-friction coating may be at least 20% less, at least 25% less, at least 30% less, at least 40% less, or even at least 50% less than a coefficient of friction of a surface of an uncoated glass container formed from a same glass composition.

In some embodiments, the portion of the coated glass container with the low-friction coating may have a coefficient of friction of less than or equal to about 0.7 after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the low-friction coating may not increase by more than about 30% after exposure to a temperature of about 260° C. for 30 minutes. In other embodiments, the coefficient of friction of the portion of the coated glass container with the low-friction coating may not increase by more than about 30% (i.e., about 25%, about 20%, about 15%, or event about 10%) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, the coefficient of friction of the portion of the coated glass container with the low-friction coating may not increase by more than about 0.5 (i.e., about 0.45, about 0.04, about 0.35, about 0.3, about 0.25, about 0.2, about 0.15, about 0.1, or event about 0.5) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the low-friction coating may not increase at all after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the coated glass container with the low-friction coating may have a coefficient of friction of less than or equal to about 0.7 after being submerged in a water bath at a temperature of about 70° C. for 10 minutes. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the low-friction coating may not increase by more than about 30% after being submerged in a water bath at a temperature of about 70° C. for 10 minutes. In other embodiments, the coefficient of friction of the portion of the coated glass container with the low-friction coating may not increase by more than about 30% (i.e., about 25%, about 20%, about 15%, or event about 10%) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the low-friction coating may not increase at all after being submerged in a water bath at a temperature of about 70° C. for 5 minutes, 10 minutes, 20 minutes, 30 minutes, 40 minutes, 50 minutes, or even 1 hour.

In some embodiments, the portion of the coated glass container with the low-friction coating may have a coefficient of friction of less than or equal to about 0.7 after exposure to lyophilization conditions. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the coated glass container with the low-friction coating may not increase by more than about 30% after exposure to lyophilization conditions. In other embodiments, the coefficient of friction of the portion of the coated glass container with the low-friction coating may not increase by more than about 30% (i.e., about 25%, about 20%, about 15%, or event about 10%) after exposure to lyophilization conditions. In some embodiments, the coefficient of friction of the portion of the coated glass container with the low-friction coating may not increase at all after exposure to lyophilization conditions.

In some embodiments, the portion of the coated glass container with the low-friction coating may have a coefficient of friction of less than or equal to about 0.7 after exposure to autoclave conditions. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the coated glass container with the low-friction coating may not increase by more than about 30% after exposure to autoclave conditions. In other embodiments, the coefficient of friction of the portion of the coated glass container with the low-friction coating may not increase by more than about 30% (i.e., about 25%, about 20%, about 15%, or event about 10%) after exposure to autoclave conditions. In some embodiments, the coefficient of friction of the portion of the coated glass container with the low-friction coating may not increase at all after exposure to autoclave conditions.

The coated glass containers described herein have a horizontal compression strength. The horizontal compression strength is measured as discussed in U.S. patent application Ser. No. 13/780,740 filed on Feb. 28, 2013, which is incorporated herein by reference in its entirety. A measurement of the horizontal compression strength can be given as a failure probability at a selected normal compression load. As used herein, failure occurs when the glass container ruptures under a horizontal compression in least 50% of samples. In some embodiments, a coated glass container may have a horizontal compression strength at least 10%, 20%, or 30% greater than an uncoated vial.

The horizontal compression strength measurement may also be performed on an abraded glass container. Specifically, operation of a testing jig may create damage on the coated glass container outer surface, such as a surface scratch or abrasion that weakens the strength of the coated glass container. The glass container is then subjected to a horizontal compression procedure, wherein the container is placed between two platens with the scratch pointing outward parallel to the platens. The scratch can be characterized by the selected normal pressure applied by a vial-on-vial jig and the scratch length. Unless identified otherwise, scratches for abraded glass containers for the horizontal compression procedure are characterized by a scratch length of 20 mm created by a normal load of 30 N.

The coated glass containers can be evaluated for horizontal compression strength following a heat treatment. The heat treatment may be exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the horizontal compression strength of the coated glass container is not reduced by more than about 20%, 30%, or even 40% after being exposed to a heat treatment, such as those described above, and then being abraded. In one embodiment, the horizontal compression strength of the coated glass container is not reduced by more than about 20% after being exposed to a heat treatment of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, and then being abraded.

The coated glass articles described herein may be thermally stable after heating to a temperature of at least 260° C. for a time period of 30 minutes. The phrase "thermally stable," as used herein, means that the low friction coating applied to the glass article remains substantially intact on the surface of the glass article after exposure to the elevated temperatures such that, after exposure, the mechanical properties of the coated glass article, specifically the coefficient of friction and the horizontal compression strength, are only minimally affected, if at all. This indicates that the low friction coating remains adhered to the surface of the glass following elevated temperature exposure and continues to protect the glass article from mechanical insults such as abrasions, impacts and the like.

In embodiments, the coated glass containers may be thermally stable. As described herein, the coated glass containers are considered to be thermally stable if the coefficient of friction standard and the horizontal compression strength standard are met after exposing the coated glass containers to a temperature of at least about 260° C. for a time period of about 30 minutes (i.e., the coated glass containers are thermally stable at a temperature of at least about 260° C. for a time period of about 30 minutes). The thermal stability may also be assessed at temperatures from about 260° C. up to about 400° C. For example, in some embodiments, the coated glass containers will be considered to be thermally stable if the standards are met at a temperature of at least about 270° C., or even about 280° C. for a time period of about 30 minutes. In still other embodiments, the coated glass containers will be considered to be thermally stable if the standards are met at a temperature of at least about 290° C., or even about 300° C. for a time period of about 30 minutes. In further embodiments, the coated glass containers will be considered to be thermally stable if the standards are met at a temperature of at least about 310° C. or even about 320° C. for a time period of about 30 minutes. In still other embodiments, the coated glass containers will be considered to be thermally stable if the standards are met at a temperature of at least about 330° C., or even about 340° C. for a time period of about 30 minutes. In yet other embodiments, the coated glass containers will be considered to be thermally stable if the standards are met at a temperature of at least about 350° C., or even about 360° C. for a time period of about 30 minutes. In some other embodiments, the coated glass containers will be considered to be thermally stable if the standards are met at a temperature of at least about 370° C., or even about 380° C. for a time period of about 30 minutes. In still other embodiments, the coated glass containers will be considered to be thermally stable if the standards are met at a temperature of at least about 390° C., or even about 400° C. for a time period of about 30 minutes.

The coated glass containers disclosed herein may also be thermally stable over a range of temperatures, meaning that the coated glass containers are thermally stable by meeting the coefficient of friction standard and horizontal compression strength standard at each temperature in the range. For example, in the embodiments described herein, the coated glass containers may be thermally stable from at least about 260° C. to a temperature of less than or equal to about 400° C. In some embodiments, the coated glass containers may be thermally stable in a range from at least about 260° C. to about 350° C. In some other embodiments, the coated glass containers may be thermally stable from at least about 280° C. to a temperature of less than or equal to about 350° C. In still other embodiments, the coated glass containers may be thermally stable from at least about 290° C. to about 340° C. In another embodiment, the coated glass container may be thermally stable at a range of temperatures of about 300° C. to about 380° C. In another embodiment, the coated glass container may be thermally stable at a range of temperatures from about 320° C. to about 360° C.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of forming a glass container, the method comprising:
    forming a glass container comprising a sidewall at least partially enclosing an interior volume, at least a portion of an interior surface of the sidewall having an interior surface layer, and the interior surface of the sidewall having a delamination factor of greater than 10; and
    contacting the glass container with a substantially fluoride-free aqueous treating medium to remove a thin layer of the interior surface layer having a thickness of from about 100 nm to about 1.0 µm from the interior surface of the sidewall, wherein
    the interior surface of the sidewall has a delamination factor of less than or equal to 10 after the thin layer of the interior surface layer is removed.

2. The method according to claim 1, wherein the glass container has a delamination factor of less than or equal to 6 after the thin layer of the interior surface layer is removed.

3. The method according to claim 1, wherein the thin layer of the interior surface layer that is removed has a thickness of from about 100 nm to about 750 nm.

4. The method according to claim 1, wherein the substantially fluoride-free aqueous treating medium comprises about 0.001 weight percent to about 0.15 weight percent fluoride ions.

5. The method according to claim 1, wherein the substantially fluoride-free aqueous treating medium is a substantially fluoride-free aqueous acidic treating medium comprising a member selected from the group consisting of HCl, HBr, $HNO_3$, $H_2SO_4$, $H_2SO_3$, $H_3PO_4$, $H_3PO_2$, HOAc, citric acid, tartaric acid, ascorbic acid, ethylenediaminetetraacetic acid, methanesulfonic acid, toluenesulfonic acid, a mixture thereof, and a combination comprising at least one of the foregoing acids.

6. The method according to claim 5, wherein the substantially fluoride-free aqueous acidic treating medium comprises a member selected from the group consisting of HCl, $HNO_3$, $H_2SO_4$, and $H_3PO_4$.

7. The method according to claim 5, wherein the substantially fluoride-free aqueous acidic treating medium has a pH of less than or equal to about 3.

8. The method according to claim 1, wherein the substantially fluoride-free aqueous treating medium comprises about 0.001 weight percent to about 0.015 weight percent fluoride ions.

9. The method according to claim 1, wherein the glass container is formed from a Type I, Class A or a Type I, Class B glass according to ASTM Standard E438-92.

10. The method according to claim 1, wherein the glass container is formed from a borosilicate glass.

11. The method according to claim 1, further comprising contacting an exterior surface of the sidewall with the substantially fluoride-free aqueous treating medium.

12. The method according to claim 11, wherein, before the exterior surface of the sidewall is contacted with the substantially fluoride-free aqueous treating medium, the exterior surface of the sidewall comprises strength-limiting surface flaws having a first shape, and
    after the contacting the exterior surface of the sidewall with the substantially fluoride-free aqueous treating medium, the strength-limiting surface flaws have a second shape.

13. The method according to claim 12, wherein the second shape comprises blunted crack tips.

14. The method according to claim 11, wherein the glass container is an ion-exchange-strengthened glass container comprising a surface compressive stress layer on at least the exterior surface of the sidewall.

15. The method according to claim 14, wherein the exterior surface of the sidewall has a compressive stress of greater than or equal to about 250 MPa.

16. The method according to claim 14, wherein a level of surface compression is reduced by an amount of from about 0.1% to about 4% by contacting the exterior surface of the sidewall with the substantially fluoride-free aqueous treating medium.

17. The method according to claim 1, further comprising applying a low-friction coating on at least the exterior surface of the sidewall.

18. The method according to claim 17, wherein the low-friction coating is thermally stable.

* * * * *

UNITED STATES PATENT AND TRADEMARK OFFICE
CERTIFICATE OF CORRECTION

Page 1 of 2

PATENT NO. : 10,065,884 B2
APPLICATION NO. : 14/949320
DATED : September 4, 2018
INVENTOR(S) : Dana Craig Bookbinder et al.

It is certified that error appears in the above-identified patent and that said Letters Patent is hereby corrected as shown below:

On the Title Page

On page 5, Column 1, item (56), other publications, Line 10, delete "polyimide/titanic" and insert -- polyimide/titania --, therefor.

On page 5, Column 1, item (56), other publications, Line 36, delete "European of Journal Glass" and insert -- European Journal of Glass --, therefor.

On page 5, Column 1, item (56), other publications, Line 49, delete "2011." and insert -- 2013. --, therefor.

On page 5, Column 1, item (56), other publications, Line 56, delete "Offce" and insert -- Office --, therefor.

On page 5, Column 2, item (56), other publications, Line 23, delete "Polymide" and insert -- Polyimide --, therefor.

On page 5, Column 2, item (56), other publications, Line 26, delete "Dow Coming," and insert -- Dow Corning, --, therefor.

On page 6, Column 1, item (56), other publications, Line 34, delete "htm>." and insert -- html>. --, therefor.

On page 6, Column 1, item (56), other publications, Line 51, delete "silsesquioxane-polymide" and insert -- silsesquioxane-polyamide --, therefor.

On page 6, Column 1, item (56), other publications, Line 52, delete "thermomerchanical" and insert -- thermomechanical --, therefor.

Signed and Sealed this
Twenty-fourth Day of March, 2020

Andrei Iancu
*Director of the United States Patent and Trademark Office*

On page 6, Column 2, item (56), other publications, Line 20, delete "J. Watjen, et al." and insert -- U. Watjen, et al. --, therefor.